United States Patent [19]
Akashi et al.

[11] Patent Number: 5,381,206
[45] Date of Patent: Jan. 10, 1995

[54] FOCUS DETECTING DEVICE

[75] Inventors: Akira Akashi, Yokohama; Hiroshi Matsushima, Machida, both of Japan

[73] Assignee: Canon Kabushiki Kaisha, Tokyo, Japan

[21] Appl. No.: 914,580

[22] Filed: Jul. 20, 1992

[30] Foreign Application Priority Data

Jul. 22, 1991 [JP] Japan .................................. 3-180978
Jul. 23, 1991 [JP] Japan .................................. 3-182516

[51] Int. Cl.⁶ .............................................. G03B 13/36
[52] U.S. Cl. .................................................. 354/402
[58] Field of Search ............... 354/402, 406, 407, 408

[56] References Cited

U.S. PATENT DOCUMENTS

| | | | |
|---|---|---|---|
| 4,572,476 | 2/1986 | Oinoue | 250/201 |
| 4,716,282 | 12/1987 | Akashi et al. | 250/201 |
| 4,816,861 | 3/1989 | Taniguchi et al. | 354/408 |
| 4,974,003 | 11/1990 | Ohnuki et al. | 354/400 |
| 5,081,479 | 1/1992 | Kadohara et al. | 354/402 |

FOREIGN PATENT DOCUMENTS

| | | | |
|---|---|---|---|
| 3318983 | 5/1983 | Germany | G02B 7/11 |
| 56-75607 | 6/1981 | Japan | G02B 7/11 |
| 57-45510 | 3/1982 | Japan | G02B 7/11 |
| 58-142306 | 8/1983 | Japan | G02B 7/11 |
| 59-107313 | 6/1984 | Japan | G02B 7/11 |
| 60-101513 | 6/1985 | Japan | G02B 7/11 |
| 60-247211 | 12/1985 | Japan | G02B 7/11 |

*Primary Examiner*—W. B. Perkey
*Attorney, Agent, or Firm*—Fitzpatrick, Cella, Harper & Scinto

[57] ABSTRACT

Improved accuracy is contrived in a focus detecting device for finding the amount of correlation between signals corresponding to images received on first and second sensor arrays. A picture element signal of each sensor is duplicated and taken out as a signal of a double Information amount, thereby enabling correlation calculation to be effected accurately.

9 Claims, 22 Drawing Sheets

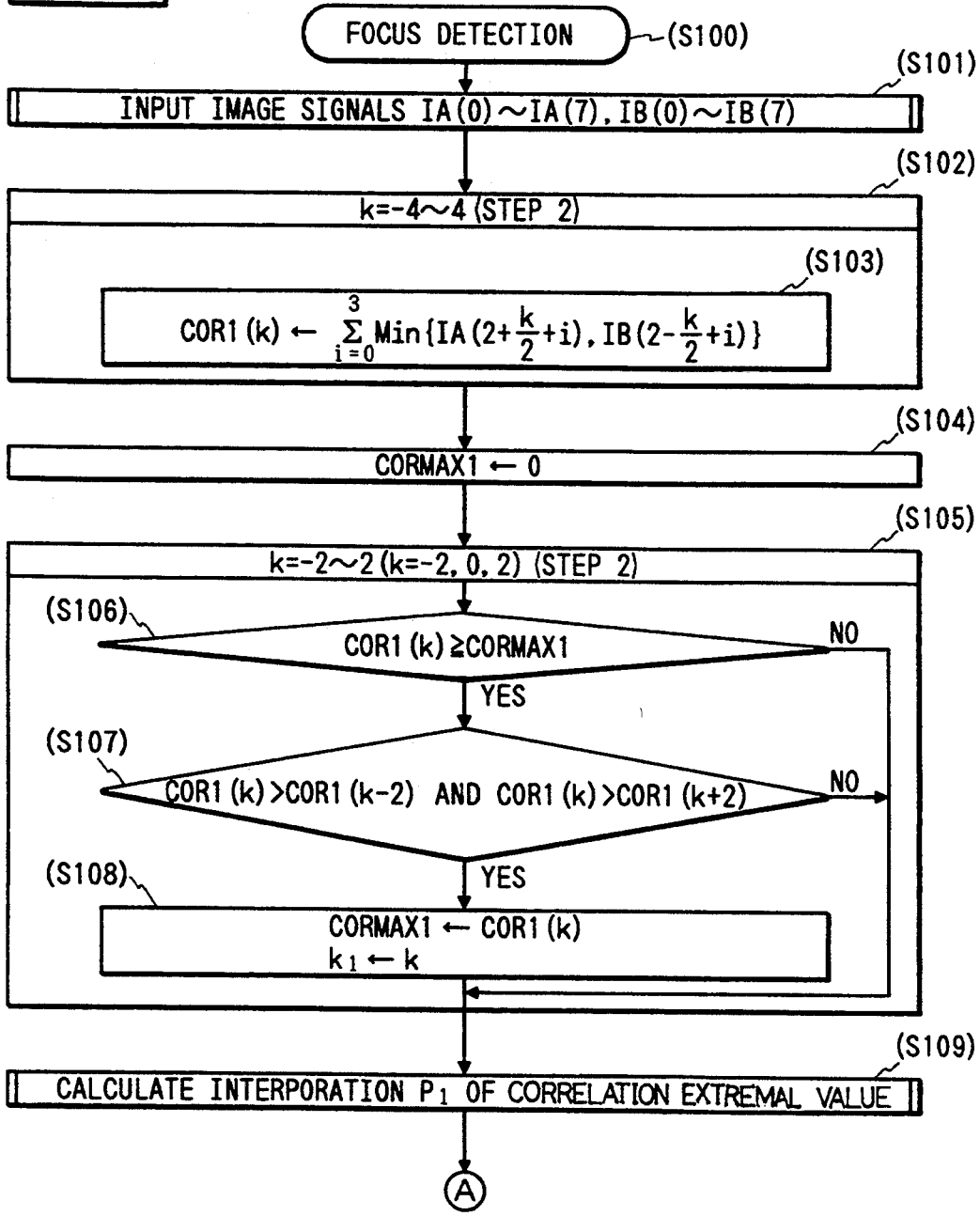

FOCUS DETECTING DEVICE

BACKGROUND OF THE INVENTION

1. Field of the Invention

This invention relates to a focus detecting device for use in an optical apparatus such as a camera, and particularly to a signal processing method for focus detection.

2. Related Background Art

As one focus detecting device for single lens reflex cameras, there is well known a device in which the pupil of a photo-taking lens is divided into two areas and the displacement of the relative position of two object images formed by light fluxes passed through the divided pupil areas is observed to thereby detect the focus state of the photo-taking lens. The principle of this device will hereinafter be described briefly with reference to FIG. 10 of the accompanying drawings.

In FIG. 10, a field lens 2 is disposed coaxially with a photo-taking lens 1 to be focus-detected, and two secondary imaging lenses 3a and 3b are juxtaposed rearwardly of the field lens 2, and light receiving photoelectric conversion sensor arrays 4a and 4b are disposed rearwardly of the secondary imaging lenses 3a and 3b, respectively. Designated by 5a and 5b are stops provided near the secondary imaging lenses. The field lens 2 substantially images the exit pupil of the photo-taking lens 1 on the pupil planes of the two secondary imaging lenses 3a and 3b. As a result, light fluxes entering the secondary imaging lenses 3a and 3b emerge from areas of equal dimensions on the exit surface of the photo-taking lens 1 which correspond to the secondary imaging lenses 3a and 3b and do not overlay, each other.

When aerial images formed near the field lens 2 are re-imaged on the surfaces of the sensor arrays 4a and 4b by the secondary imaging lenses 3a and 3b, the re-imaged two images change their positions on the basis of the difference between the positions in the direction of the optical axis at which said aerial images are formed.

FIG. 11 of the accompanying drawings shows the manner in which this phenomenon occurs. Depending on whether, with the in-focus state of FIG. 11A as the center, the so-called focus state is front focus or rear focus as shown in FIG. 11B or 11C, the two images formed on the surfaces of the sensor arrays 4a and 4b move in opposite directions on said surfaces. If this image intensity distribution is photoelectrically converted and an electrical process is effected on the obtained photoelectric conversion signal to thereby detect the relative positional deviation of said two images, the focus detection of the photo-taking lens can be accomplished.

Numerous methods of detecting the amount of deviation of said two images have been proposed, and the most popular one of them is a method of finding a correlation which shifts the two photoelectric conversion image signals relative to each other, and regards the shift position highest in the correlation as the amount of image deviation.

For example, various methods are disclosed in Japanese Laid-Open Patent Application No. 56-75607 (hereinafter referred to as "Prior Art Example 1"), Japanese Laid-Open Patent Application No. 57-45510 (hereinafter referred to as "Prior Art Example 2"), Japanese Laid-Open Patent Application No. 60-247211 (hereinafter referred to as "Prior Art Example 3"), and applicants' Japanese Laid-Open Patent Application No. 58-142306 or No. 59-107313 (hereinafter referred to as "Prior Art Example 4").

The techniques of correlation calculation disclosed in the above-mentioned prior art examples are characterized by the following procedures:
(1) the operator of correlation calculation;
(2) the manner of finding the external value of the amount of correlation; and
(3) a method of shifting the correlation calculation.

The operator will first be described.

In Prior Art Example 1, Prior Art Example 2 and Prior Art Example 3, the amount of correlation is calculated with "the absolute value of the difference between two corresponding signals" or "the power of the absolute value of the difference between two corresponding signals" used as the operator of a correlation function.

In prior Art Example 4, "a greater (or smaller) value of two corresponding signals" is used as the operator of a correlation function.

The meaning of the operator will now be described briefly.

When two object image signal systems are defined as IA(i) and IB(i), the operator called "the absolute value of the difference between two corresponding signals" (hereinafter referred to as "the absolute value of the difference") calculates the amount of correlation COR(K) in shift K in accordance with the following equation (1):

$$COR(K) = \sum_{i} |IA(i) - IB(i + K)| \quad (1)$$

On the other hand, the operator called "a greater value of two corresponding signals" or "a smaller value of two corresponding signals" (hereinafter referred to as "a greater value" or "a smaller value") calculates the amount of correlation COR(K) in accordance with the following equations (2) and (3):

$$COR(K) = \sum_{i} \text{Max}\{IA(i), IB(i + K)\} \quad (2)$$

$$COR(K) = \sum_{i} \text{Min}\{IA(i), IB(i + K)\} \quad (3)$$

In the above equations, Max{x, y} and Min{x, y} are operators which extract the greater one and the smaller one, respectively, of real numbers x and y.

When the amount of correlation is calculated in accordance with the above-mentioned equations, an amount of shift which is greatest in correlation can be determined from the amount of correlation obtained for each shift. This amount of shift corresponds to the amount of image deviation of two object images, and from this, the focus state (the defocus amount) of the photo-taking lens can be detected.

If as described above, the amount of shift which is greatest in correlation is simply regarded as the amount of image deviation, the detectable amount of image deviation is only obtained for one shift of the object signal system, i.e., at the integer unit of one picture element. If this is converted into a defocus amount, the resolving power thereof will become relatively rough and will be of an insufficient level in practice.

The aforementioned prior art examples disclose techniques of detecting an amount of image deviation which is greatest in correlation with a resolving power of a decimal unit finer than the integer unit of one picture element, and those techniques are classified broadly into two kinds.

One of the two kinds is a technique of finding an extreme value of correlation of a decimal unit from an amount of correlation of an integer shift unit directly by interpolation (hereinafter referred to as "the direct interpolation technique"). The other technique is a technique of interpolating and finding a shift of a decimal unit in which a linear derived function, i.e., the differential value of the amount of correlation (although actually it is a difference value because the amount of correlation is a discrete amount of a shift unit) becomes zero (hereinafter referred to as "the differential interpolation technique"). This is based on the principle that when the linear derived function becomes zero, the original function thereof assumes an extreme value.

In "the direct interpolation technique", an amount of shift for which the amount of correlation is expected to become smallest is interpolated and found from the amounts of correlation at three points, i.e., a shift in which the amount of correlation calculated at each shift becomes smallest and the shifts before and after said shift, at a measure finer than the shift unit, and this is regarded as the amount of image deviation. The aforementioned Prior Art Example 3 corresponds to this, and its specific method is disclosed in detail in Prior Art Example 3.

On the other hand, in "the differential interpolation technique", the difference amount of the amount of correlation is calculated in advance at each shift and a shift in which the sign of the difference amount varies is detected, and from the difference amount between that shift and its neighboring shifts, an amount of shift in which the difference amount is expected to become zero, that is, the amount of correlation is expected to assume an extreme value, is interpolated and found also at a measure finer than the shift unit.

For example, the correlation difference amount at the shift K when the operator is "the absolute value of difference" is calculated in accordance with the following equation (4):

$$DIF(K) = \Sigma |IA(i) - IB(i+K+1)| - \Sigma |IA(i+1) - IB(i+K)| \quad (4)$$

The extreme value detecting techniques of the aforementioned Prior Art Example 1, Prior Art Example 2 and Prior Art Example 4 correspond to this, and their specific method is disclosed in detail in Prior Art Example 2.

Description will now be made of a shifting method of correlation calculation.

The setting method of applicants' Japanese Laid-Open Patent Application No. 56-50315 (hereinafter referred to as "Prior Art Example 5") will hereinafter be described with reference to FIG. 12 of the accompanying drawings.

In FIG. 12, the reference characters 10a and 10b indicate the intensity distributions of two object images on the surfaces of the two sensor arrays 4a and 4b in FIG. 10, and this example represents a case where simple geometrical edge images deviate by 0.5 picture elements from each other. Each sensor is comprised of 8 picture elements, the number of signals of the image signal system is also shown as 8 picture elements. Arrows 12a and 12b indicate calculation areas for correlation calculation, and when the shift k of correlation calculation is, e.g. 4, as shown in FIG. 12, the correlation among signals of 4 picture elements on the left side is calculated by the signal 10a and the correlation among signals of 4 picture elements on the right side is calculated by the signal 10b. When the shift k is 2, the calculation areas are symmetrically shifted by one picture element each, and the correlation among image signals of 4 picture elements is likewise calculated. Likewise, with the number of calculation picture elements kept fixed, the calculation areas are varied as shown in conformity with the shift. The sign of the shift k corresponds to the so-called front focus and rear focus.

The method of shifting the calculation areas of two image signals symmetrically and mutually in conformity with the correlation shift will hereinafter be referred to as the "mutual shift".

In the "mutual shift" method, two image signals are shifted at a time and therefore, unavoidably, the shift of correlation is a 2-shift unit. Accordingly, if the number of signals of the image signal system is 8 picture elements and the number of calculation picture elements is 4, the shift k which can be calculated is −4, −2, 0, 2 and 4.

FIG. 15 of the accompanying drawings is a graph in which the amount of correlation calculated by the "mutual shift" is plotted by the use of the "absolute value of the difference" as the operator. C(−4), C(−2), C(0), C(2) and C(4) represent the amounts of correlation in the shift k = −4, −2, 0, 2, 4, respectively. To detect an extreme value of correlation of a decimal unit from this plot, the extreme value of correlation can be interpolated from the three points at the amounts of correlation C(−2), C(0) and C(2) by the use of "the direct interpolation technique", as indicated by broken line in FIG. 15 and at the same time, an amount of shift kp which gives that extreme value can be found. A method of finding the extreme value of correlation of a decimal unit from the amounts of correlation of three points is disclosed in detail in "Prior Art Example 3" and therefore need not be described herein.

FIG. 15 is a graph in which the amount of correlation is plotted by the use of an operator which is the "absolute value of difference" in order to illustrate the "mutual shift". In Prior Art Example 5, the "mutual shift" is used as the shifting method, but how to find the extreme value of correlation is not specifically shown.

The shifting method in Prior Art Example 3 will now be described with reference to FIG. 13 of the accompanying drawings.

In FIG. 13, as in FIG. 12, the reference characters 10a and 10b indicate the intensity distributions of two object images, and arrows 12a and 12b indicate calculation areas for correlation calculation.

The feature of the shifting method in Prior Art Example 3 is that two object images are characterized as a "fiducial portion" and a "reference portion" and correlation calculation is executed with the fiducial portion remaining fixed and with the image signal of the reference portion shifted.

As shown, as long as the shift k is between −2 and 2, the calculation area 12a for the image signal 10a of the fiducial portion is fixed and only the calculation area 12b for the image signal 10b of the reference portion moves. In this shifting method, only one of the image signals moves and therefore, the correlation calculation for each shift is possible unlike the case of the aforedescribed "mutual shift" of Prior Art Example 5.

When the shift $k=-2$ or 2, the calculation area 12b for the image signal 10b of the reference portion strikes against the end of the whole signal area and therefore cannot move any more. So, in order to calculate the shift $k=-3$ or greater, such a contrivance is made that the calculation area 12a for the image signal 10a of the fiducial portion which should originally be fixed is moved by an amount corresponding to two picture elements and the shift $k=-3$ of two images is relatively realized. This also holds true of the shift $k=3$ and so on.

The shifting method in which like this, the calculation area for one image signal is fixed and only the calculation area for the other image signal is moved will hereinafter be referred to as the "one image shift".

FIG. 16 of the accompanying drawings shows a graph in which the amounts of correlation calculated by the use of the operator, "the absolute value of difference" and the shifting method, the "one image shift" of Prior Art Example 3 are plotted.

In FIG. 16, $C(-4)$ to $C(4)$ represent the amounts of correlation at the shift $k=-4$ to 4, respectively.

To detect the extreme value of correlation of a decimal unit from this plot, a minimum value of correlation can be interpolated from three points, i.e., the amounts of correlation $C(-1)$, $C(0)$ and $C(1)$ or $C(0)$, $C(1)$ and $C(2)$, by the use of "the direct interpolation technique" as indicated by broken line and at the same time, an amount of shift kp which gives that minimum value can be found.

Both Prior Art Example 5 and Prior Art Example 3 find the amount of shift of a decimal unit which gives the extreme value of correlation, but depending on the difference in the shifting method, in Prior Art Example 5, use is made of three amounts of correlation spaced apart from one another by two shifts each, whereas in Prior Art Example 3, use is made of three amounts of correlation spaced apart from one another by one shift each.

The shifting method and how to find the extreme value of correlation in Prior Art Example 2 will now be described with reference to FIG. 14A of the accompanying drawings.

In FIG. 14A, as in FIGS. 12 and 13, the reference characters 10a and 10b indicate the intensity distributions of two object images, and arrows 12a and 12b indicate calculation areas for correlation calculation.

The feature of the shifting method of "Prior" Art Example 2 is that as shown, at the shift $k=0$, the whole signal area of image signals 10a and 10b is the object of calculation and as shift is made from $k=0$, the calculation range is symmetrically decreased from one end of the calculation area.

This shifting method resembles the "mutual shift" of Prior Art Example 5, but in the "mutual shift, the absolute positions of the calculation areas of two image signals are mutually and symmetrically changed with the number of calculation picture elements remaining fixed as the shift is made. Thus, the change of the relative position of the two calculation areas is effected in a two-shift unit.

In contrast, in Prior Art Example 2 (FIG. 14A), as a shift is made, the number of calculation picture elements changes and the absolute position of the calculation area for one of two image signals is not changed by the positive or the negative sign of the shift k. Accordingly, two calculation areas are effected in a one-shift unit.

The shifting method whereby like this, only one of the calculation areas is moved while the calculation picture elements of two image signals are decreased will hereinafter be referred to as "calculation number variable shift".

What must be specified here is that in Prior Art Example 2, correlation calculation is effected in the calculation areas themselves indicated by arrows 12a and 12b in FIG. 14A. FIG. 14A illustrates the difference between Prior Art Example 2 and the other prior art examples. Prior Art Example 2 actually uses "the differential interpolation technique" as the method of detecting the extreme value of correlation and therefore is designed such that, as shown in FIG. 14B of the accompanying drawings, the calculation areas are decreased by one picture element each at a certain shift and accordingly, the amounts of calculation are calculated in two pairs of calculation areas (15a, 15b) and (16a, 16b) spaced apart from each other by an amount corresponding to $\pm 1$ shift about that shift and the difference therebetween is calculated.

FIG. 17 of the accompanying drawings is a graph in which the amounts of correlation difference $D(-4)$ - $D(4)$ at each shift are plotted. The operator is "the absolute value of difference".

Since the object images mentioned as the examples are originally deviated from each other by 0.5 picture element, the amount of correlation should assume an extreme value at the shift $k=0.5$. As is apparent from FIG. 17, the amount of correlation difference has its sign changed at the shift $k=0$ and the shift $k=1$, and this means that the amount of correlation difference is zero between the shift $k=0$ and the shift $k=1$, that is, there exists an amount of shift of a decimal unit in which the amount of correlation which is an original function gives an extreme value. So, in Prior Art Example 2, two points, i.e., the amounts of correlation difference $D(0)$ and $D(1)$, are interpolated to thereby find an amount of shift kp in which the amount of correlation difference is estimated as zero. The interpolation method of finding an extreme value of correlation of a decimal unit from the amounts of correlation difference of two points is disclosed in detail in Prior Art Example 2 and therefore need not be described herein.

As regards the method of detecting image deviation disclosed in applicants' Prior Art Example 4, the interpolation method for the extreme value of correlation and the shifting method are "the differential interpolation technique" and "the calculation number variable shift" identical to Prior Art Example 2, but are techniques using "a greater value"]or "a smaller value" as the operator.

FIG. 18 of the accompanying drawings shows a graph in which the amounts of correlation difference by Prior Art Example 4 are plotted. The amounts of correlation difference $E(-4)$ - $E(4)$ represent a case where "a greater value" is used as the operator, and the amounts of correlation difference $F-4)$ - $F(4)$ represent a case where "a smaller value" is used as the operator. The method of finding an extreme value of correlation kp of a shift unit or less may be the same as Prior Art Example 2.

As previously described, in Prior Art Example 2, the extreme value of correlation is detected by the use of the amount of difference and therefore, it is permitted to vary the number of calculation picture elements in conformity with shift. On the other hand, in the case of "the direct interpolation technique" in which the extreme value of correlation is directly detected, if the number of calculation picture elements at each shift is varied, there may arise a case where a right extreme value cannot be detected because the amount of information contributing to each amount of correlation is not uniform. That is, "the direct interpolation technique" which directly interpolates the extreme value from the amount of correlation holds good because it tacitly assumes that the amount of correlation varies at a predetermined rate in conformity with shift, and if the number of picture elements used in the calculation of the amount of correlation is varied by shift, the amount of correlation will be varied by two factors, i.e., shift and the number of calculation picture elements, and interpolation calculation will not hold good.

Where as in Prior Art Example 2, the "calculation number variable/shift" is used, it is combined with "the differential interpolation technique" and as shown in FIG. 14B, the number of calculation picture elements for the amounts of correlation spaced apart from each other by two shifts which effects difference calculation is made constant for each shift.

The image deviation detecting techniques of the prior art described hitherto may be summed up thus:

1. As the operator of correlation calculation:
   (1.1) "the absolute value of difference" (Prior Art Examples 1, 2 and 3); and
   (1.2) "a greater value (or a smaller value)" (Prior Art Example 4);
2. As the interpolation method for the extreme value of correlation:
   (2.1) "the direct interpolation technique" (Prior Art Example 3); and
   (2.2) "the differential interpolation technique" (Prior Art Examples 1, 2 and 3); and
3. As the correlation calculation shifting method:
   (3.1) "mutual shift" (Prior Art Example 5);
   (3.2) "one image shift" (Prior Art Example 3); and
   (3.3) "calculation number variable shift" (Prior Art Examples 2 and 4).

However, it is better that the "calculation number variable shift" mentioned under item (3.3) above not be used in combination with "the direct interpolation technique" mentioned under item (2.1) above.

Now, as described above, various methods of detecting image deviation have been proposed, but those methods give rise to differences in performance depending on the object image observed.

For a geometrical object image entirely free of noise, a right amount of image deviation can be detected even if any technique is used. However, if random noise from a photoelectric conversion sensor or low-frequency noise such as the ghost of an optical system mixes with the object image signal, there will arise a difference in S/N which depends on the object image, depending on the difference between techniques.

As an example, in the case of a pattern in which the object image observed is generally flat like a so-called edge pattern and has only partially a variation in luminance, if a portion having that variation in luminance exists in the end portion of the calculation area of correlation calculation, a method using "a greater value (or a smaller value)" is superior in S/N to an image deviation detecting method using "the absolute value of difference" as the operator. The reason is described in detail in applicants' Japanese Laid-Open Patent Application No. 60-101513 (hereinafter referred to as "Prior Art Example 6").

Also, when low-frequency noise such as the ghost of an optical system mixes with the object image signal, there is generally the tendency that the error is smaller in "the direct interpolation technique" of directly finding an extreme value from an amount of correlation than in "the differential interpolation technique" of finding an extreme value from an amount of correlation difference as the interpolation method for an extreme value of correlation, although it depends on the object. This is considered to be attributable chiefly to the amount of correlation of how many points being used for interpolation calculation. "The differential interpolation technique" effects interpolation calculation by the use of the amount of correlation difference of two points but substantially it effects interpolation calculation by the use of the amount of correlation of four points because the amount of difference is calculated from the amount of correlation of two points as shown in equation (4). On the other hand, "the direct interpolation technique" uses the amount of correlation of three points. Thus, if the amount of correlation of each shift is fluctuated by noise, "the differential interpolation technique" using a greater number of amounts of correlation is more liable to be affected by noise.

Also, as the shift method for correlation calculation, the "mutual shift" can be said to be more disadvantageous in S/N than the other methods. In the case of the "mutual shift", as previously described, the amount of correlation can be obtained only at two-shift unit, while in the other two methods, i.e., the "one image shift" and the "calculation number variable shift", the amount of correlation can be obtained at one-shift unit. Thus, in the interpolation calculation of the "mutual shift", calculation is effected for the position of the extreme value of correlation to be found, by the use of the amount of correlation at a shift farther in distance than in the other methods. It is readily anticipated that the error of interpolation calculation will be enlarged if the distance between the coordinates of the amounts of correlation used for interpolation calculation becomes longer.

Summing up what has been hitherto described about the relative superiority of the image deviation detecting methods, by procedures, it can be said that as regards the operator, "a greater value (or a smaller value)" is generally superior in S/N, as regards the interpolation technique for the extreme value of correlation, "the direct interpolation technique" is generally superior in S/N, and as regards the shifting method for correlation calculation, except the "mutual shift", the "one image shift", if combined with "the direct interpolation technique", is generally superior in S/N.

However, an image deviation detecting method comprising a combination of the above-described preferable procedures cannot detect a right amount of image deviation. The plot of the amount of correlation by this combination is shown in FIG. 19 of the accompanying drawings. "A greater value (or a smaller value)" is used as the operator, "the direct interpolation technique" is used as the interpolation technique for the extreme value of correlation, and the "one image shift" is used as the shifting method. A case where a geometrical edge image deviates by 0.5 picture element as in the examples hitherto described is supposed as the object image signal.

The amounts of correlation $A(-4) - A(4)$ represent a case where "a greater value" is used as the operator, and the amounts of correlation $B(-4) - B(4)$ represent a case where "a smaller value" is used as the operator. As can be seen from FIG. 19, whichever of said two amounts of correlation is used, the position is not shown at 0.5 picture element which is the original amount of image deviation, that is, the extreme value is not shown at the shift k=0.5, and correct image deviation detection is impossible.

However, if the object image is of such a geometrical bar pattern as shown in FIG. 20A or 20B of the accompanying drawings, correct image deviation detection will became possible if "a greater value (or a smaller value)" is used as the operator. The plots of the amounts of correlation in these cases are shown in FIGS. 21A and 21B of the accompanying drawings. The amounts of correlation A(−4) - A(4) and the amounts of correlation B(−4) - B(4) are the amounts of correlation when the operator is "a greater value" and "a smaller value", respectively, and a case where as in the examples hitherto described, two images deviate from each other by 0.5 picture element is supposed as the object image. In this case, whichever of said two amounts of correlation is used, the amount of shift kp of the extreme value of correlation represents 0.5 picture element which is the original amount of image deviation, and a right extreme value can be detected.

The reason why the operator which is "a greater value (or a smaller value)" has such a nature can be considered as follows.

The correlation function is a function of which amount of correlation becomes smallest (or greatest) at a shift position whereat two signal systems are most similar to each other and the amount of correlation increases (or decreases) away from that shift position. However, if with "a greater value" as the operator and moreover with the calculation area of one image fixed, the amount of correlation of a "bilateral asymmetrical" image signal like an edge image is calculated, there occurs a situation in which if the sign of the shift is positive, the amount of correlation thereof varies in conformity with the shift, but if the sign of the shift is negative, the amount of correlation does not vary even if the shift is changed. That is, when the edge portion of one image comes into an "envelope" made by the luminance signal of a fixed edge image, even if the image that has come in that state is shifted, the operator which is "a greater value" will always only extract a predetermined signal along the envelope of the fixed image and no variation will appear in the amount of correlation.

In the case of the "mutual shift", the calculation area is always varying without one image being fixed and therefore, the state as described above does not occur. Accordingly, irrespective of the sign of the shift, the amount of correlation varies in conformity with the shift and the detection of the extreme value of correlation becomes possible.

After all, the operator which is "a greater value sum (or a smaller value sum) of two corresponding signals" is an operator which, depending on the object, cannot detect a right amount of image deviation if the calculation area of one of the image signals is combined with fixed correlation calculation.

SUMMARY OF THE INVENTION

One aspect of the present invention is to provide a focus detection apparatus in which signals from each picture element of a sensor are reproduced to enlarge the amount of information from the picture elements and relative calculation is performed to thus reproduced signals.

Another aspect of the present invention is, under the aspect described above, to provide a focus detection device in which enlarged processing of imaging signals can be performed in a simplified manner.

A further aspect of the present invention is to propose a focus detection device in which the relative calculation to each output of the picture elements of the sensor is performed a plurality of times with changing the number of picture elements to which the calculation is executed and the information for focusing is obtained on the basis of the results for each relative calculation.

Other aspect of the present Invention will become apparent in the embodiments described below with reference to the attached drawings.

BRIEF DESCRIPTION OF THE DRAWINGS

FIG. 26 comprising FIGS. 26A and 26B is a diagram showing the program flow of the second embodiment.

FIGS. 28A and 23B illustrate the interpolating operations for the amount of correlation.

DESCRIPTION OF THE PREFERRED EMBODIMENTS

The invention will hereinafter be described with respect to the preferred embodiments thereof.

First Embodiment

Figure 1A:
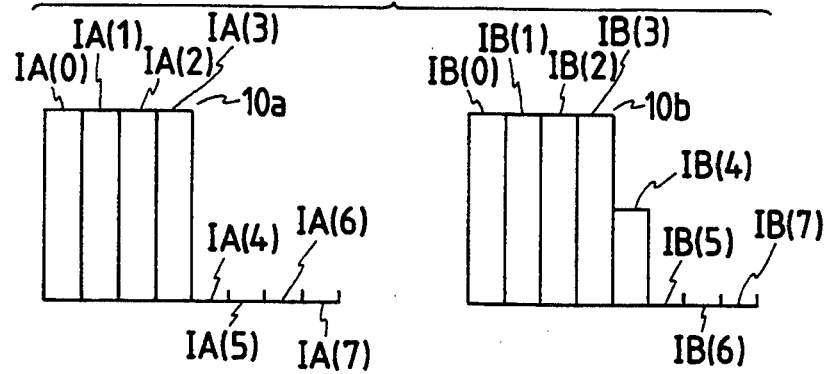
FIGS. 1A and 1B illustrate the principles of correlation calculation according to the present invention.
Figure 1B:
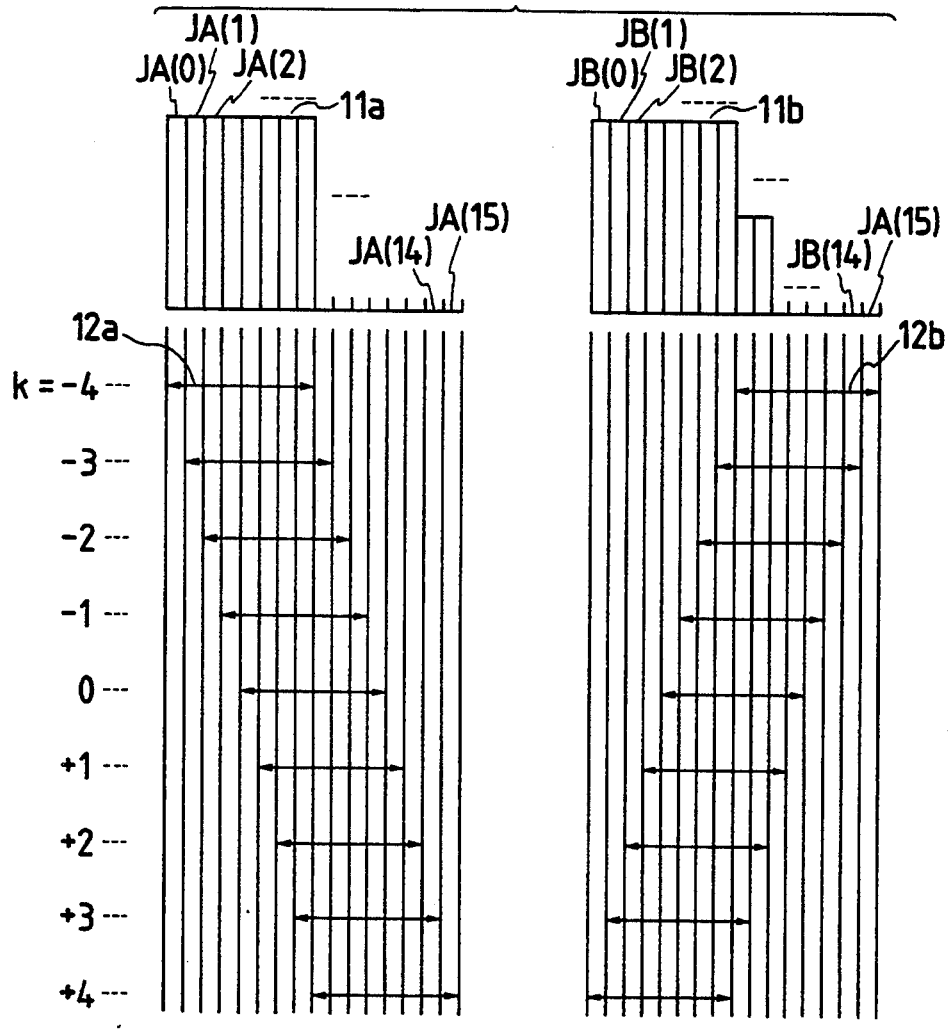

FIGS. 1A and 1B illustrate the enlargement of an object image signal effected in the present invention prior to correlation calculation, and the setting of a calculation area resulting from shifting.

Figure 10:
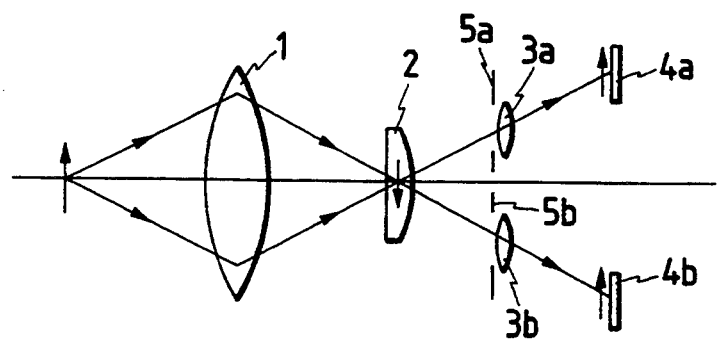
FIG. 10 illustrates the principle of a focus detecting optical system.
Figure 11A:
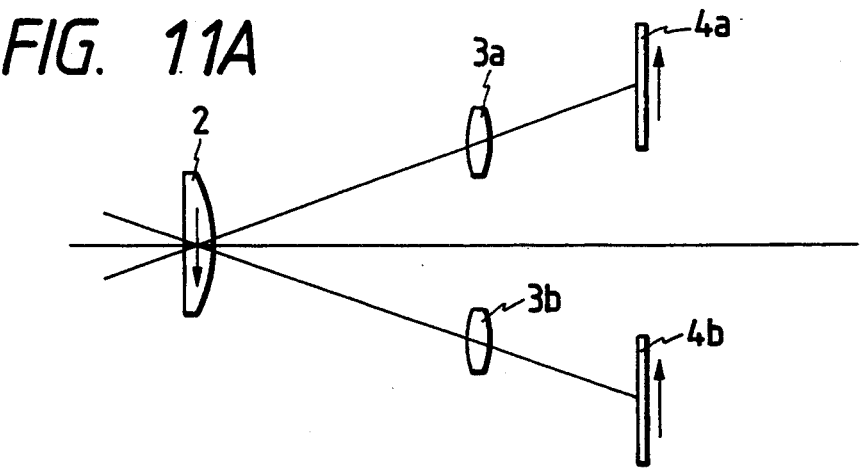
FIGS. 11A to 11C illustrate the principles of the focus detecting optical system with FIG. 10.
Figure 11B:
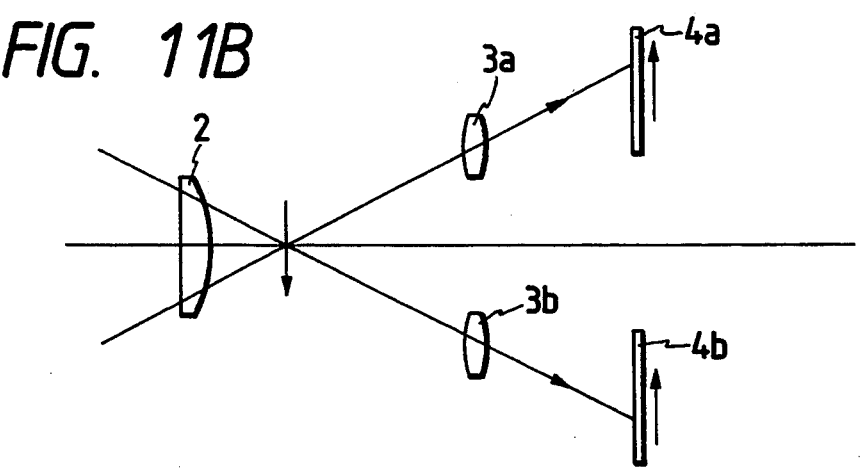
Figure 11C:
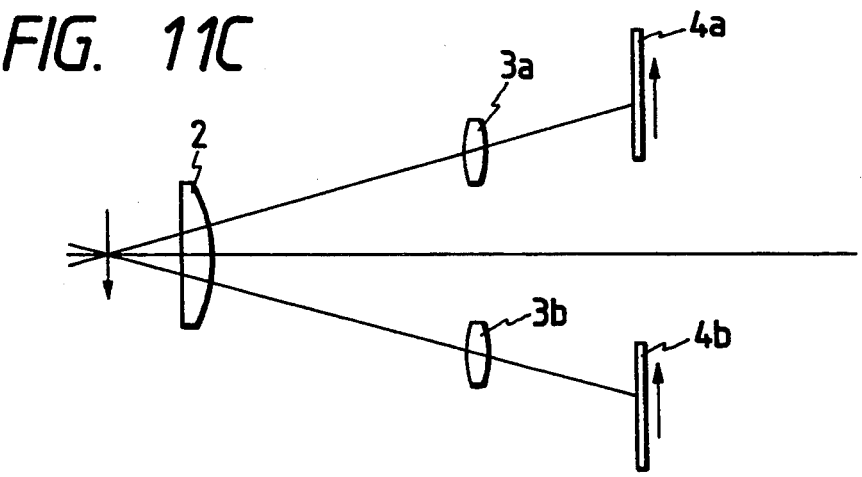

In FIG. 1, the reference characters 10a and 10b indicate the intensity distributions of two object images on the surfaces of sensor arrays 4a and 4b in FIG. 10, and in this example, represent a case where simple geometrical edge images deviate from each other by 0.5 picture elements. The number of signals of an image signal system is 8 picture elements. Also, in FIG. 1, IA(0) - IA(7) indicate the outputs of the picture elements of the sensor array 4a, and IB(0) - IB(7) indicate the outputs of the images of the sensor 4b.

The enlargement of the image signal is effected by duplicating the picture element signals of the image signal systems 10a and 10b and enlarging them to a double signal number, and converting them into image signal systems in which the number of signals is 16 picture elements, as indicated by 11a and 11b in FIG. 1B. Specifically, it is such an enlarging operation that the first picture element signal IA(0) of the image signal system 10a is made into the first picture element signal JA(0) and the second picture element signal JA(1) of the image signal system 11a and the second picture element signal IA(1) of the image signal system 10a is made into the third picture element signal JA(2) and the fourth picture element signal JA(3) of the image signal system 11a.

Correlation calculation is effected on the thus enlarged object image signals 11a and 11b. In FIG. 1, arrows 12a and 12b represent calculation areas for correlation calculation, and are the same "mutual shift" as FIG. 7. It should be noted that in the "mutual shift" of FIG. 7, two images are moved at a time and therefore, the correlation calculation is a correlation calculation of a two-shift unit, while in FIG. 1B, the image is moved after the image signal is enlarged to double. Therefore, correlation calculation of a one-shift unit as converted into the original image signal system becomes possible.

Figure 2:
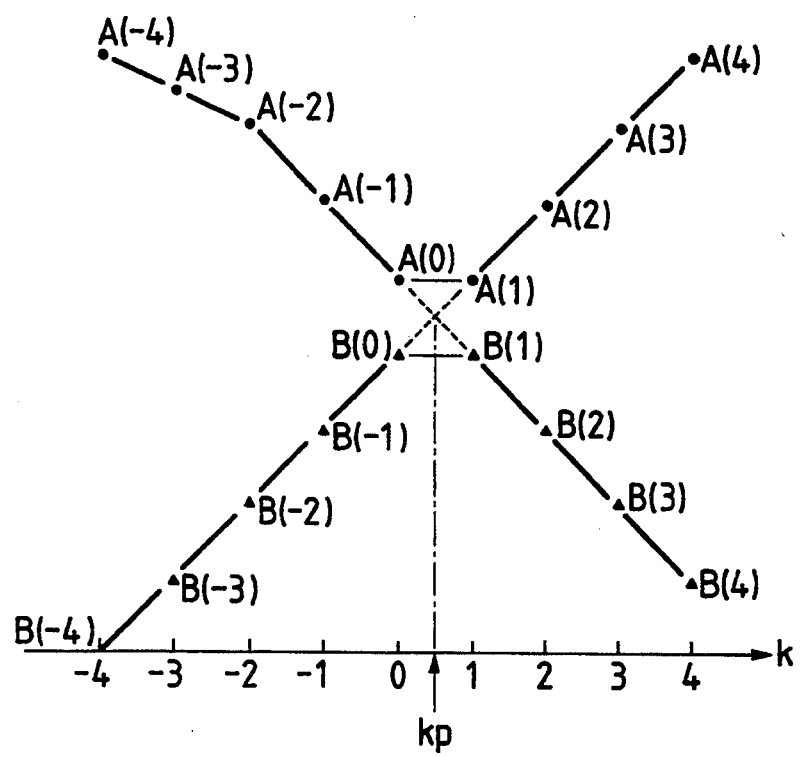
FIG. 2 is a plot graph of the amount of correlation of a first embodiment of the correlation calculation according to the present invention.

FIG. 2 shows a graph in which the amount of correlation at each shift in the correlation calculation according to the present invention is plotted. As the operator, use is made of "a greater value (or a smaller value)". Amounts of correlation A(−4) - A(4) and amounts of correlation B(−4) - B(4) are the amounts of correlation when the operator is "a greater value" and "a smaller value", respectively.

As is apparent from FIG. 2, in spite of the "mutual shift", the amount of correlation can be obtained at a one-shift unit and the detection of the extreme value of correlation can be executed accurately.

Figure 3:
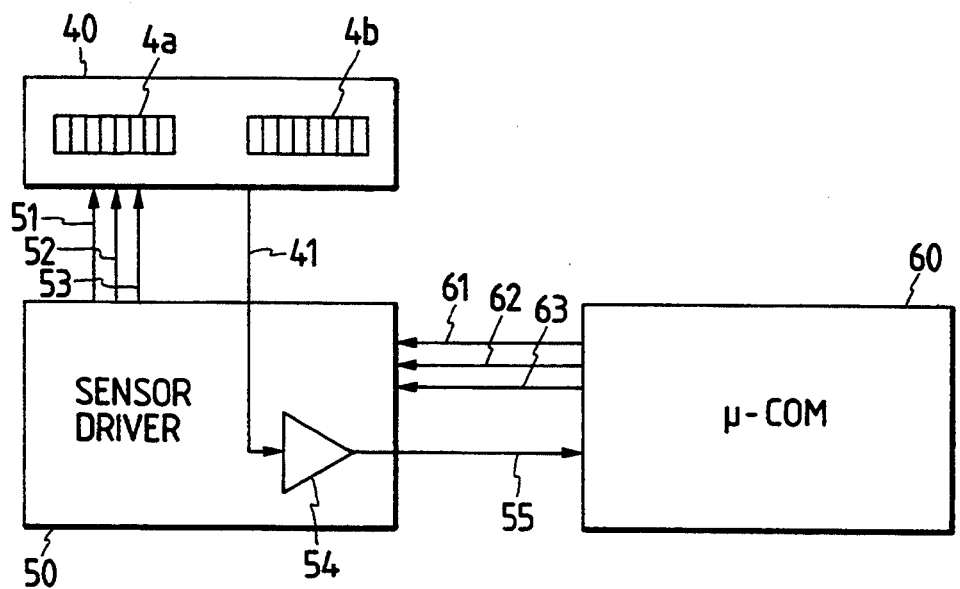
FIG. 3 is a circuit block diagram of a focus detecting device of the present invention.

FIG. 3 shows a specific circuit block diagram for realizing the focus detecting device according to the present invention.

In FIG. 3, the reference numeral 40 designates a sensor device in which two sensor arrays 4a and 4b are disposed. The reference numeral 50 denotes a sensor driving circuit, and the reference numeral 60 designates a microcomputer which effects the control and signal processing of the entire focus detecting device. The sensor driving circuit 50 is controlled by control signals 61, 62 and 63 output from the microcomputer 60, and sensor driving signals 51, 52 and 53 produced from the control signals 61, 62 and 63, respectively, are given to the sensor device 40.

When predetermined accumulation in the sensor arrays comprising accumulation type sensors is effected, an analog image signal 41 is output from the sensor device 40, and an analog image signal 55 amplified by an amplifying circuit 54 in the sensor driving circuit 50 is input to the analog input of the microcomputer 60. The microcomputer 60 A/D-converts the input analog image signal 55 in synchronism with the control signals 61, 62 and 63 output by the microcomputer itself, and stores digital image signals successively into a predetermined address of RAM contained in the microcomputer.

When the storage of the image signals is terminated, the microcomputer 60 executes a program for focus detection stored in ROM therein.

FIG. 4 shows a flow chart of the program of the microcomputer.

The "focus detection" routine of a step (S100) is called by the start of the focus detecting operation, and at a step (S101), the inputting of the aforementioned image signals is executed. The image signal 10a in FIG. 1A is defined as IA(0) - IA(7) and the image signal 10b in FIG. 1A is defined as IB(0) - IB(7).

At the next steps (S102) and (S103), the process of enlarging the image signals to a double signal amount is carried out. When the enlarged image signals 11a and 11b in FIG. 1B are JA(0) - JA(15) and JB(0) - JB(15), respectively, $$JA(2 \cdot i) \rightarrow IA(i) \quad (5)$$

$$JA(2 \cdot i + 1) \rightarrow IA(i) \quad (6)$$

$$JB(2 \cdot i) \rightarrow IB(i) \quad (7)$$

$$JB(2 \cdot i + 1) \rightarrow IB(i) \quad (8)$$

where i=0–7.

In expressions (5)–(8), IA(i) and IB(i) are converted into JA(0) - JA(15) and JB(0) - JB(1), respectively. The step (S102) represents the loop process about i, and at the step (S103) in the loop, expressions (5)–(8) are executed.

At the next steps (S104) and (S105), correlation calculation within a correlation calculation range represented in FIG. 1B is effected. In this case, "a smaller value" is used as the operator and the amount of correlation at a shift k is defined as COR(k), and the calculation by the following expression (9) is effected:

$$COR(k) \leftarrow \sum_{i=0}^{7} \text{Min}\{JA(4 + k + i), JB(4 - k + i)\}, \quad (9)$$

where $k = -4 - +4$.

The process at the steps (S104) and (S105) means the correlation calculation by the above-mentioned expression (9) using "a smaller value" within each calculation range at each k value shown in FIG. 1B. That is, when $k=-4$, with the signals JA(0)–JA(7) and the signals JB(8)–JB(15) as objects, the smaller value of JA(0) and JB(8), the smaller value of JA(1) and JB(9), the smaller value of JA(2) and JB(10), the smaller value of JA(3) and JB(11), the smaller value of JA(4) and JB(12) and the smaller value of JA(7) and JB(15) are selected, and the addition value of the selected smaller values is found as COR$-4$).

Also, when $k=-3$, with the signals JA(1)–JA(8) and the signals JB(7)–JB(14) as objects, the addition value of the smaller values of the respective corresponding signals is found as COR $(-3)$. Also, when $k=-2$ to $+4$, said COR$(-2)$ - COR$(+4)$ are likewise found for each range shown in FIG. 1B.

When the calculation of the amount of correlation COR(k) at the shift $k=-4$ to $+4$ is completed, the detection of a relative extreme value is effected at steps (S106)–(S110). When "a smaller value" is adopted as the operator, the amount of correlation COR(k) ought to be come greatest at a shift in which correlation is greatest. Therefore, at the step (S106), 0 as the initial value is given in advance to a variable CORMAX storing the maximum value of the amount of correlation therein.

The step (S107) represents the loop process about k, and searches for the extreme value of the amount of correlation over the range of $k=-3$ to $+3$.

As the condition for the search for the extreme value, use is made of "the greatest" and "greater than the two points before and behind". At the step (S108), whether the amount of correlation COR(k) is greatest is judged, and at the step (S109), whether COR(k) is greater than the amounts of correlation COR(k−1) and COR (k+1) of the two points before and behind is judged. Only when both conditions are satisfied, a shift is made to the step (S110), where the variable CORMAX, which is the maximum value of the amount of correlation, is renewed by the value of COR(k) and at the same time, the current value of the shift k is stored into an extreme value shift kx. In order to effect the judgment of the step (S109) for comparing the amount of correlation with the values of the two points before and behind, the loop process of the step (S107) sets k to a range of $-3$ to $+3$, which is narrower than the shift range $(-4-+4)$ in which correlation calculateion has been actually done.

The above-mentioned search for the extreme value will now be described on the assumption that B($-4$)-B(4) of FIG. 2 represent the values of correlation COR($-4$)-COR($+4$) found at the steps (S104) and (S105).

First, at the step (S106), the variable CORMAX is rendered into CORMAX=0, whereafter at the step (S108), COR($-3$) and CORMAX are compared with each other. Since COR($-3$)=B($-3$)>CORMAX, at the step (S109), the magnitudes of COR($-3$) and COR($-4$) and the magnitudes of COR($-3$) and COR($-2$) are compared.

In this case, COR($-2$)=B($-2$)>COR($-3$)=B($-3$) and therefore, the step (S110) is not executed and k is set to $k=-2$, and the comparison of the steps (S108) and (S109) is done again. As a result, COR($-1$)=B($-1$)>COR ($-2$)=B($-2$) and therefore, the step (S110) is not executed and k is set to $k=-1$, and the steps (S108) and (S109) are executed. As a result, COR(0)=B(0)>COR($-1$)=B($-1$) and therefore, again in this case, the step (S110) is not executed and k is set to $k=0$, and the steps (S108) and (S109) are executed again. In this case, COR(0)=B(0)->COR($-1$) =B($-1$) and COR(0)=B(0)->COR(1)=B(1) and therefore, the step (S110) is not executed and COR(0)-B(0) is set as CORMAX, and kx is set to 0, whereafter k is set to k=1, and the steps (S108) and (S109) are executed again. In the process until k=1-4, the conditions of the steps (S108) and (S109) are not satisfied and therefore, the process is effected with k as k=4, whereafter advance is made to a step (S111).

When at the steps (S107)–(S110), the correlation extreme value is detected, at the next step (S111), the interpolation of the correlation extreme value is effected to find the amount of image deviation at a measure smaller than the shift unit.

As the interrolation method, use is made of a method of effecting interpolation from the amounts of correlation of three points, i.e., the shift of the greatest value and the two points before and behind it, as previously described. Here, as an example, an attempt is made to effect interpolation calculation by the method of Prior Art Example 3.

Figures 5A, 5B:
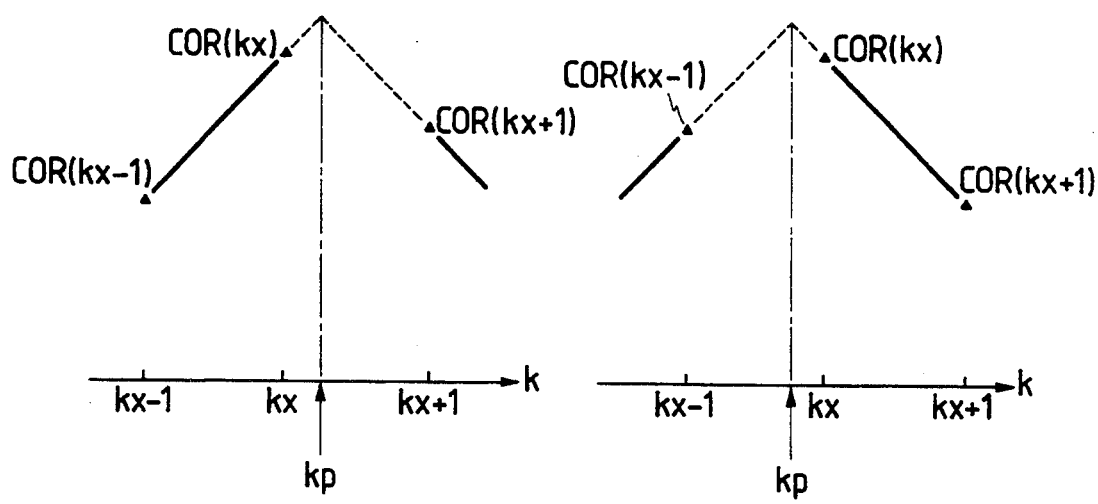
FIGS. 5A and 5B illustrate the detections of the extreme value of the amount of correlation.

When as shown in FIGS. 5A and 5B, the amount of correlation COR(kx) for calculating "a smaller value" becomes greatest at the shift kx, a case where COR(kx−1)≦COR(kx+1) (FIG. 5A) and a case where COR (kx−1)>COR (kx+1) (FIG. 5B) are conceived, depending on the magnitudes of the values of COR(kx−1) and COR(kx+1). When as shown in FIG. 5A, COR(kx−1)≦COR(kx+1), the k coordinates of the point of intersection between a straight line passing through COR(kx - 1) and COR(kx) and a straight line opposite in the sign of inclination to said straight line and passing through COR(kx+1) are defined as an amount of image deviation kp less than decimal. The amount of image deviation kp which is the result of focus detection is found by the above-described process.

When as shown in FIG. 5B, COR(kx−1)->COR(kx+1), the k coordinates of the point of intersection between a straight line passing through COR(kx) and COR(kx+1) and a straight line opposite in the sign of inclination to said straight line and passing through COR(kx−1) are defined as kp. They are expressed as follows:

(i) When COR(kx−1)≦COR(kx+1), $$kp = kx + \frac{1}{2} \cdot \frac{COR(kx + 1) - COR(kx - 1)}{COR(kx) - COR(kx - 1)} \quad (10)$$

When COR(kx−1)>COR(kx+1), $$kp = kx + \frac{1}{2} \cdot \frac{COR(kx + 1) - COR(kx - 1)}{COR(kx) - COR(kx + 1)} \quad (11)$$

In the manner described above, the amount of image deviation kp is found from the greatest correlation COR(kx) and the two points COR(kx−1) and COR(kx+1) before and behind it, but besides the method of finding the amount of image deviation by interpolating kp by straight lines as shown in FIGS. 5A and 5B, the amount of image deviation may be found as the extreme value of a quadratic function through which the three points, i.e., the amounts of correlation COR(kx−1), COR(kx) and COR(kx+1), pass.

Figure 6:
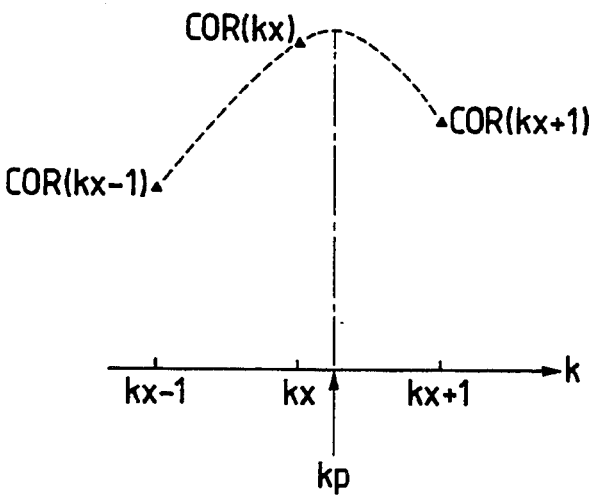
FIG. 6 is an illustration showing another example of the detection of the extreme value of the amount of correlation.

FIG. 6 is an illustration showing another example of the above-described interpolation calculation, and FIG. 6 represents an example in which the amount of image deviation kp is interpolated by a quadratic function.

If in FIG. 6, the greatest correlation COR(kx) and the two points COR(kx−1) and COR(kx+1) before and behind it are given, each coefficient of a quadratic function $COR(k)=ak^2+bk+c$ passing the three points is found, and the extreme value $k=-b/2a$ of the quadratic function is regarded as kp. kp is found from the following expression (12):

$$kp = kx + \frac{1}{2} \cdot \frac{COR(kx+1) - COR(kx-1)}{COR(kx) - [COR(kx+1) - COR(kx-1)]} \quad (12)$$

Figure 4A:
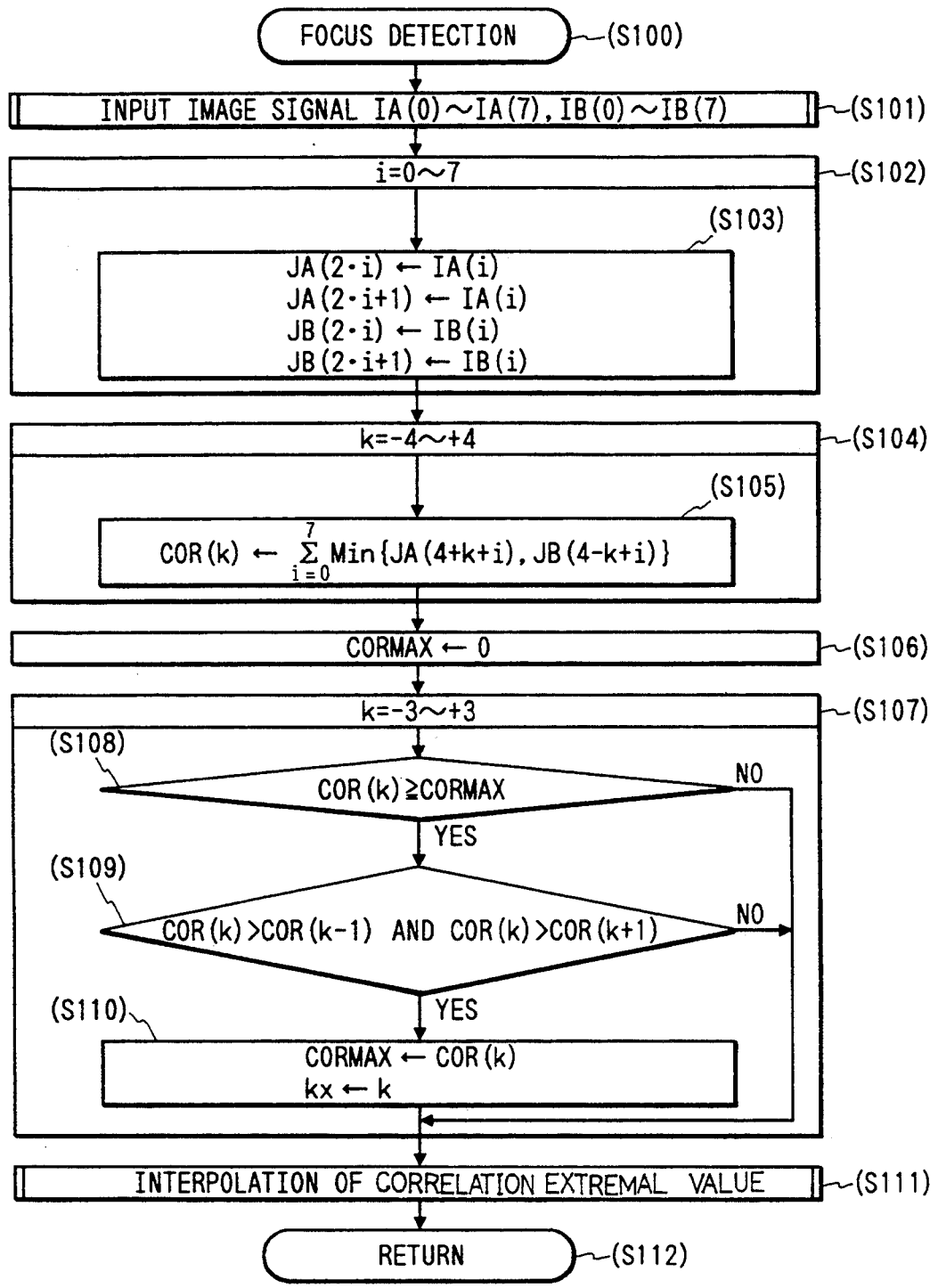
FIGS. 4A and 4B are flow charts of a micro-computer in the focus detecting device of FIG. 3.
Figure 4B:
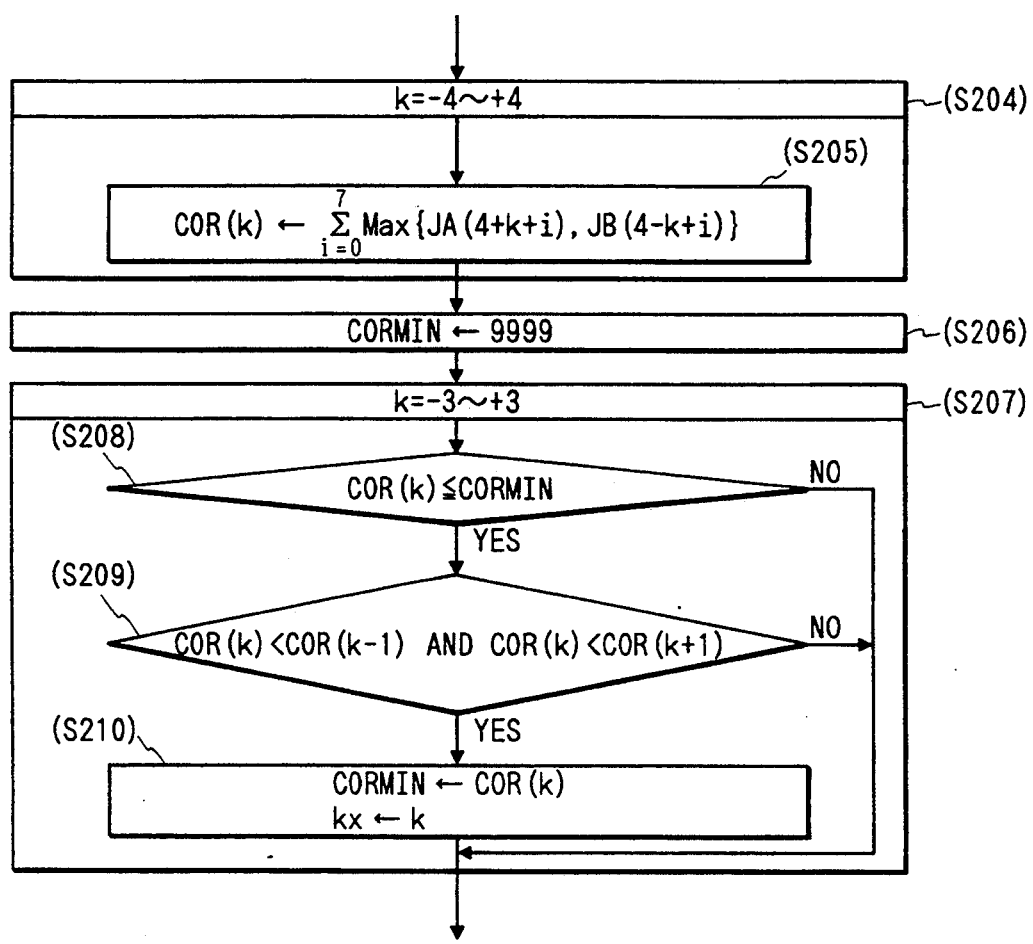

Now, the case where "a smaller value" is used as the operator of correlation has been shown in FIG. 4A, and a portion of the flow chart when "a greater value" is used as the operator is shown in FIG. 4B.

The steps (S204)–(S210) of FIG. 4B correspond to the steps (S104)–(S110) of FIG. 4A. Describing only the difference between the two, "a greater value" as the operator is used when the amount of correlation is calculated at the step (S205). When "a greater value" is used as the operator, the amount of correlation thereof is minimum for the greatest correlation.

At the next step, the initial value 9999 is stored in a variable COMIN representative of the minimum value of the amount of correlation. This is not limited to 9999, but a great value which the amount of correlation cannot assume can be stored.

At the steps (S208), (S209) and (S210), "the smallest" and "smallest than the two points before and behind" are the conditions of the search for the extreme value, and when these conditions are satisfied, at the step (S210), the minimum value variable CORMIN and the shift kx are renewed.

With regard to the interpolation of the relative extreme value, the total somewhat differs depending on whether the maximum value or the minimum value is to be found when the relative extreme value is interpolated by a straight line. That is, expression (10) is applied when $COR(kx-1) \leq COR(kx+1)$, and expression (11) is applied when $COR(kx-1) < COR(kx+1)$.

Where as shown in FIG. 6, the relative extreme value is interpolated by a quadratic function, the extreme value is found from expression (12) without the operator being resorted to as a matter of course.

Now, in the present invention, the number of signals of the image signal system is double and therefore, if correlation calculation is effected at a double signal amount, the calculation time will increase greatly as compared with the prior art.

Figure 7:
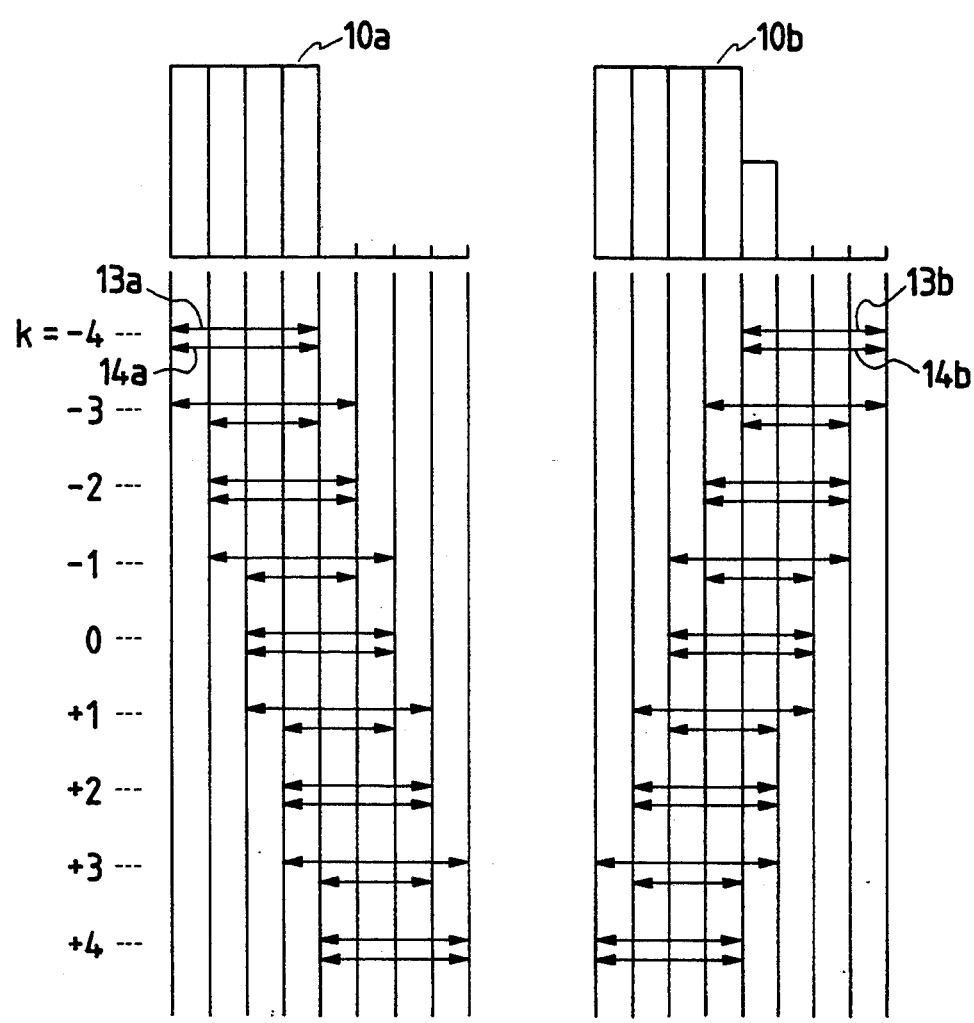
FIG. 7 is another illustration of the correlation calculation according to the present invention.

However, if such a contrivance as shown in FIG. 7 is made in correlation calculation, the calculation time will hardly be required to increase as compared with the prior art.

In FIG. 7, pairs of arrows (13a, 14a) and (13b, 14b) represent correlation calculation areas corresponding to the arrows 12a and 12b, respectively, in FIG. 1. Originally, the enlarged image signal systems 11a and 11b have been produced from the image signal systems 10a and 10b, respectively. Therefore, the amount of correlation between the area 12a of the enlarged image signal system 11a and the area 12b of the enlarged image signal system 11b is equal to a value obtained by the amount of correlation between the area 14a and the area 14b being added to the amount of correlation between the area 13a of the original image signal system 10a and the area 13b of the original image signal system 10b. In an even number shift, the areas 13a and 14a are equal to each other, and in an odd number shift, the area 13a is an area to which one block at each end of the area 14a is added.

Accordingly, the amount of correlation in the even nunsher shift is double the amount of correlation between the areas 14a and 14b, and the amount of correlation in the odd number shift is double the amount of correlation between the areas 14a and 14b, plus the amount of correlation of only the signals at the opposite ends of the areas 13a and 13b. If calculation is effected in this manner, the correlation calculation time in the enlarged image signal systems will hardly increase as compared with the calculation time in the original image signal systems.

Figure 8:
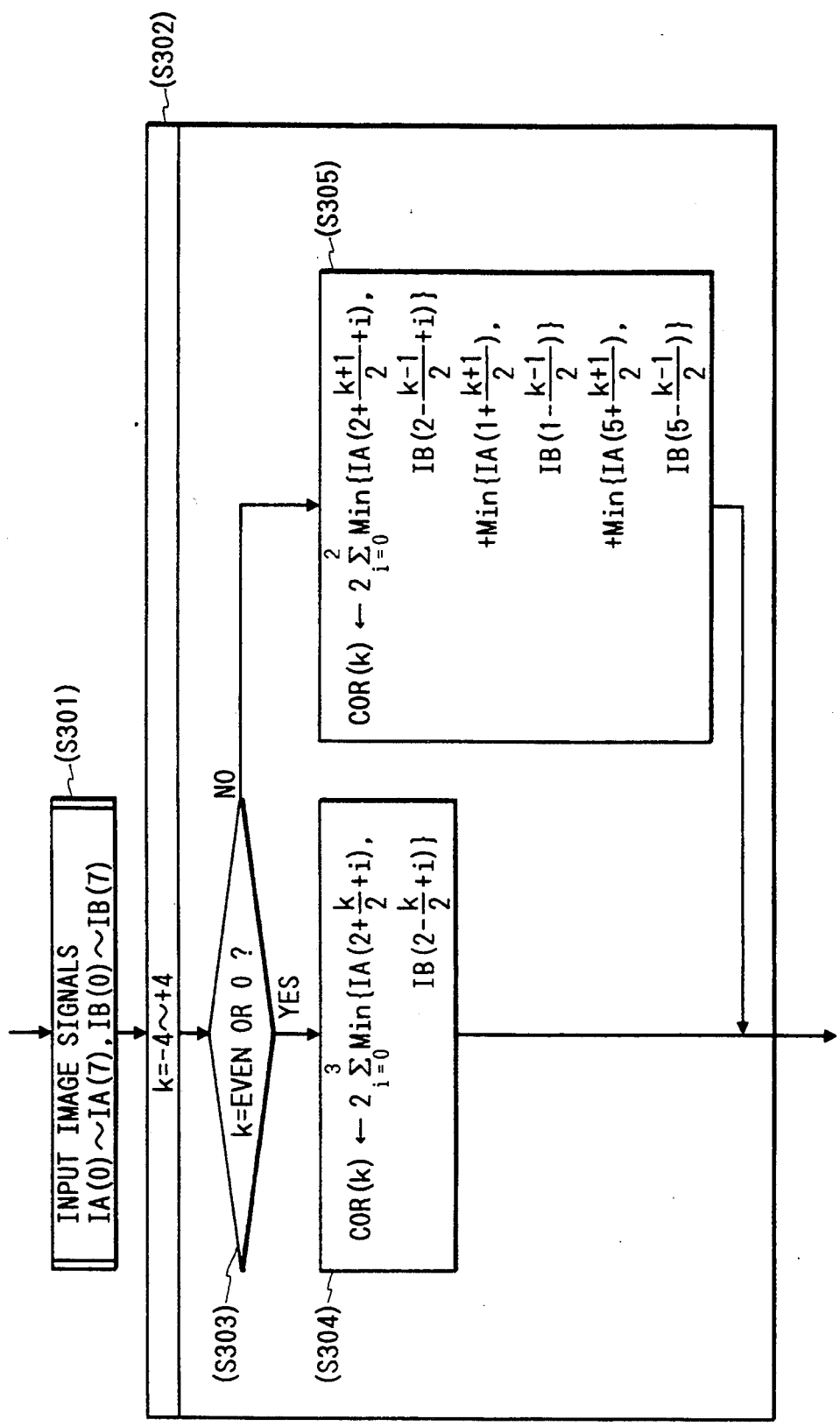
FIG. 8 is a flow chart of a microcomputer for realizing the correlation calculation of FIG. 7.

FIG. 8 shows portions of the flow chart when the calculation method of FIG. 7 is used. The steps (S301)–(S305) of FIG. 8 correspond to the steps (S101)–(S105) of FIG. 4A.

The step (S301), like the step (S101), obtains image signals IA(0)–IA(7) and IB(0)–IB(7).

The next step (S302) represents the loop process about the shift k, and executes the processing of $k=-4$ to $+4$ in the loop.

As is apparent from FIG. 7, the method of setting the calculation area differs depending on whether the shift k is an even number or an odd number. That is, when the shift k is an even number, the amount of correlation COR(k) is $$COR(k) \leftarrow 2 \cdot \sum_{i=0}^{3} \text{Min}\left\{ IA\left(2 + \frac{k}{2} + i\right), IB\left(2 - \frac{k}{2} + i\right) \right\} \quad (13)$$

On the other hand, when the shift k is an odd number, the amount of correlation COR(k) is $$COR(k) \leftarrow 2 \cdot \sum_{i=0}^{2} \text{Min}\left\{ IA\left(2 + \frac{k+1}{2} + i\right), IB\left(2 - \frac{k-1}{2} + i\right) \right\} + \text{Min}\left\{ IA\left(1 + \frac{k+1}{2}\right), IB\left(1 - \frac{k-1}{2}\right) \right\} + \text{Min}\left\{ IA\left(5 + \frac{k+1}{2}\right), IB\left(5 - \frac{k-1}{2}\right) \right\} \quad (14)$$

At the steps (S303)–(S305), COR(k) is calculated.

If in this manner, the amount of correlation COR(k) for the shift $k=-4$ to $+4$, the search for the relative extreme value and the interpolation of the extreme value of the step (S106) and subsequent steps of FIG. 4A can be effected thereafter.

In FIG. 8, "a smaller value" is used as the operator of correlation calculation, but when "a greater value" is used as the operator, "Min" in FIG. 8 can be replaced by "Max" and in that case, if the steps (S206)–(S210) of FIG. 4B and the step (S111) of FIG. 4A are executed, the amount of image deviation kp can be found.

In the above-described embodiment, as described with respect to Prior Art Example 6, when the object image observed is an image which is generally flat and has a variation in luminance only partially like a so-called edge pattern, the method using "a greater value (or a smaller value)" as the operator of correlation calculation is more advantageous in S/N than the image deviation detecting method using "the absolute value of difference" as the operator of correlation calculation and therefore, in the description so far, "a greater value (or a smaller value)" has been used as the operator. However, the operator called "the absolute value of difference" is also applicable to the image deviation detecting inethod of the present invention.

As previously described, the operator called "the absolute value of difference" can be used in combination with the "one image shift" and the "alternate shift" which are the shifting methods for correlation calculation and therefore, it seems that it is not necessary to combine it with the "mutual shift" of the present invention, but in some cases, the "one image shift" is inconvenient depending on the object image observed, because the calculation area of the fiducial portion of the image signal is fixed. This is because in the "one image shift", the calculation area of the fiducial image fixed is changed over the shift k=1 to 3 and k=−2 to −3 and therefore the amount of correlation may become discontinuous here.

Figure 13:
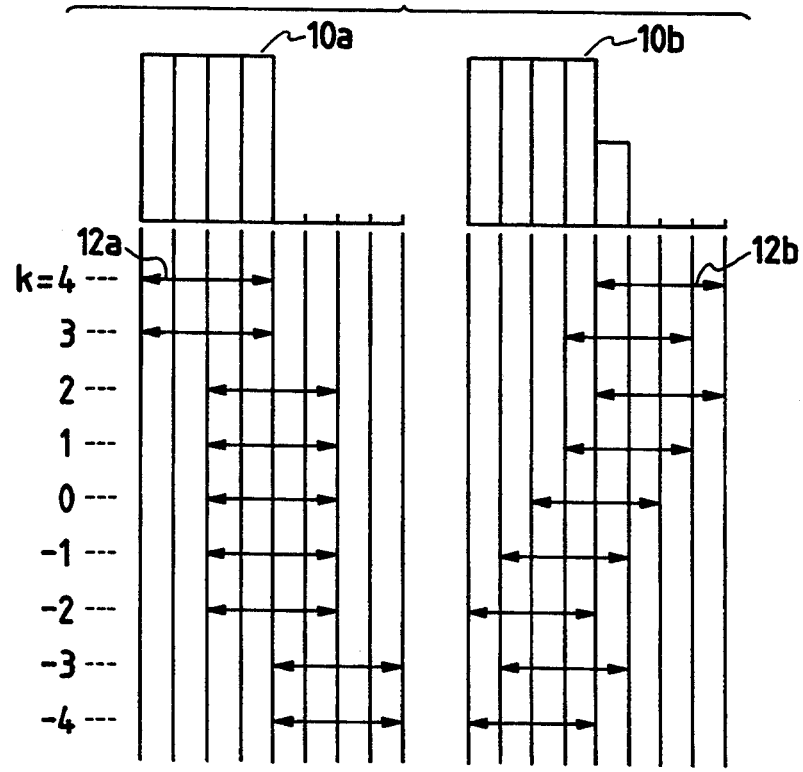
FIG. 13 illustrates the principle of another example of the correlation calculation according to the prior art.
Figure 14A:
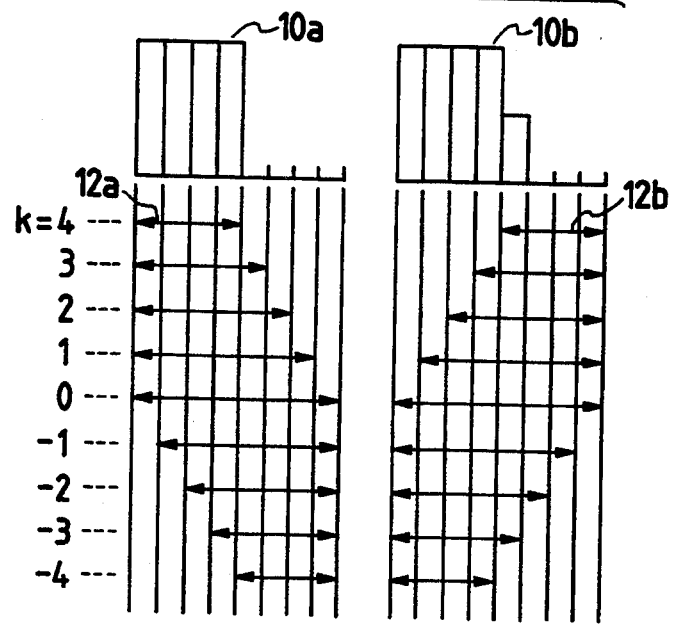
FIGS. 14A and 14B illustrate the principles of another example of the correlation calculation according to the prior art.
Figure 14B:
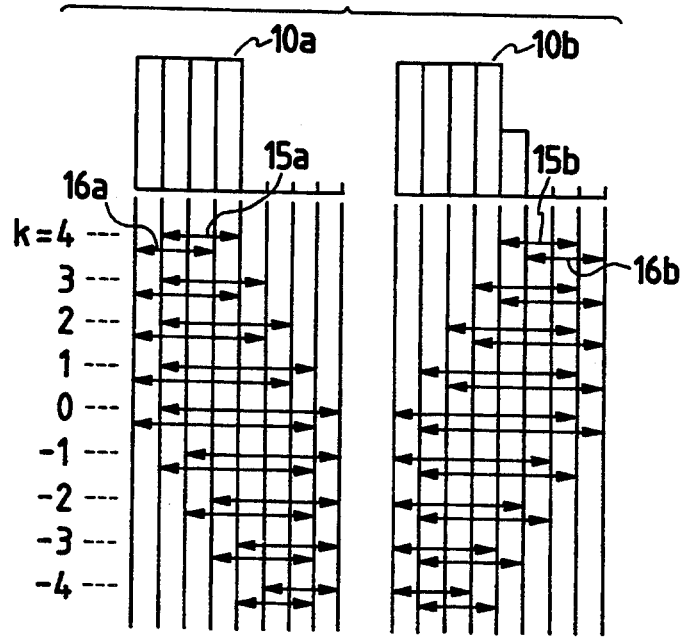
Figure 15:
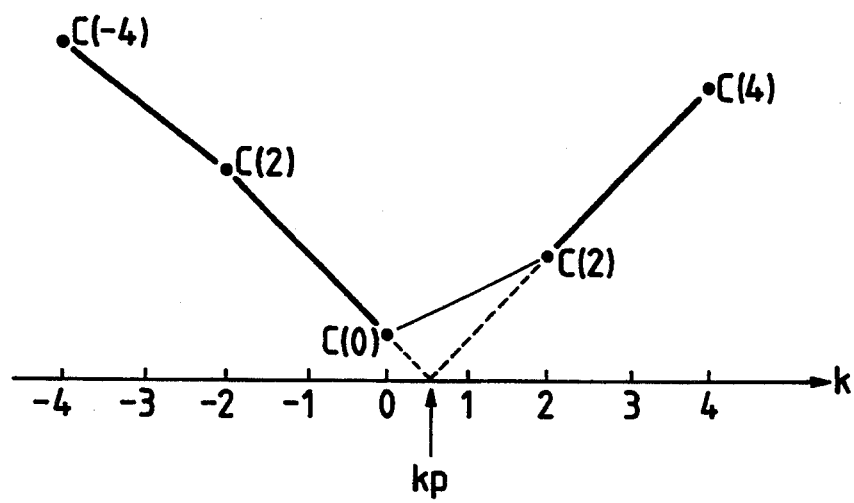
FIG. 15 is an illustration showing the result of the correlation calculation according to the prior art.
Figure 16:
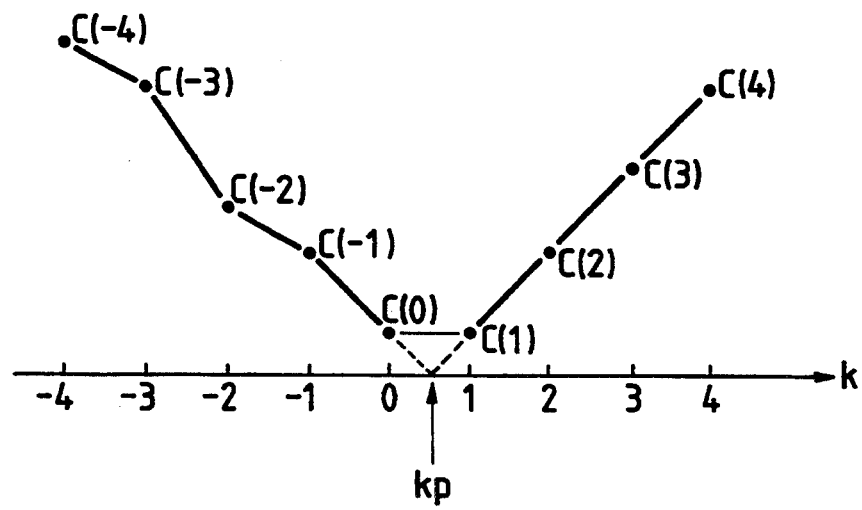
FIG. 16 is an illustration showing another example of the result of the correlation calculation according to the prior art.
Figure 17:
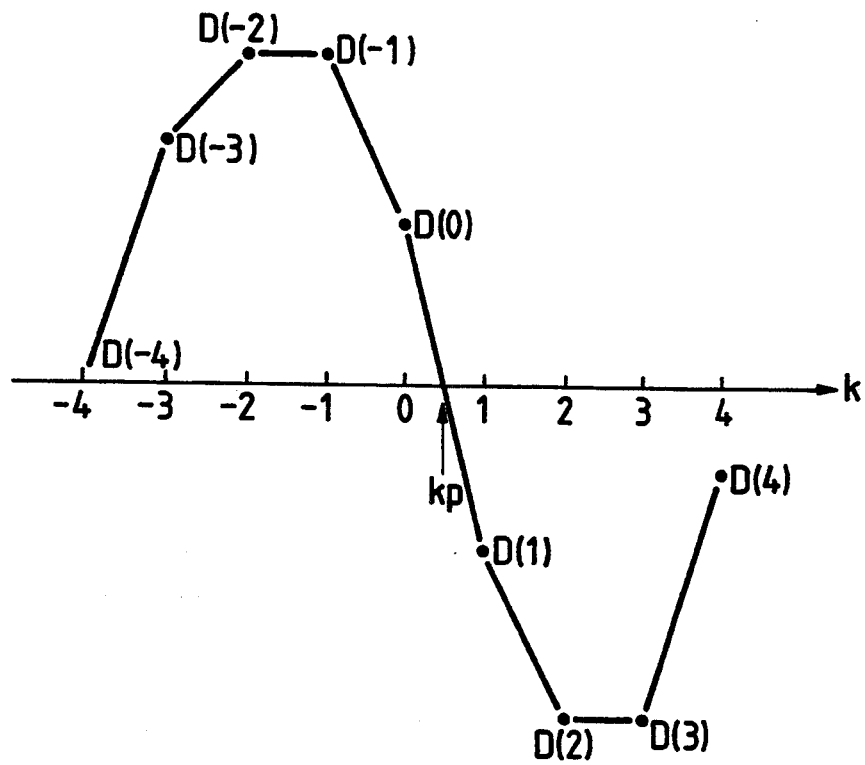
FIG. 17 is an illustration showing the result of the calculation of the amount of difference of the correlation calculation according to the prior art.
Figure 18:
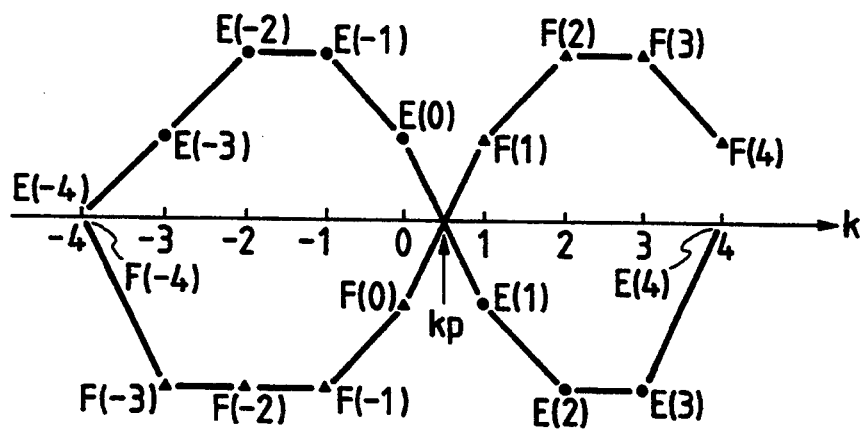
FIG. 18 is an illustration showing another example of the result of the calculation of the amount of difference of the correlation calculation according to the prior art.
Figure 19:
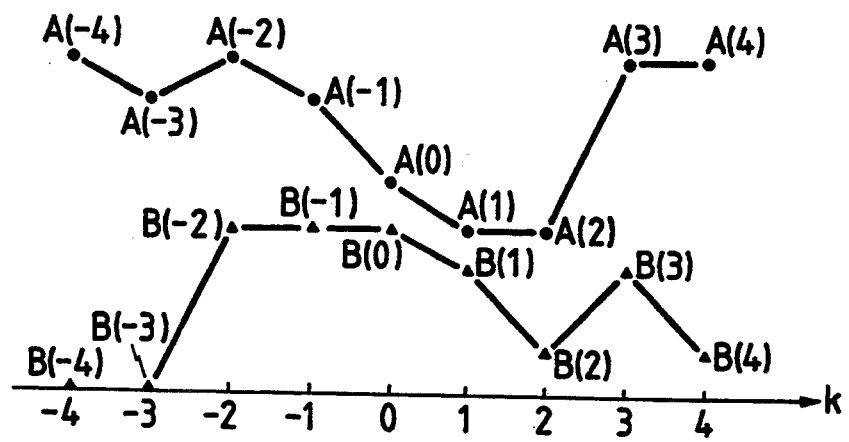
FIG. 19 is an illustration showing the amount of correlation calculation by a combination of the examples of the prior art.
Figure 20A:
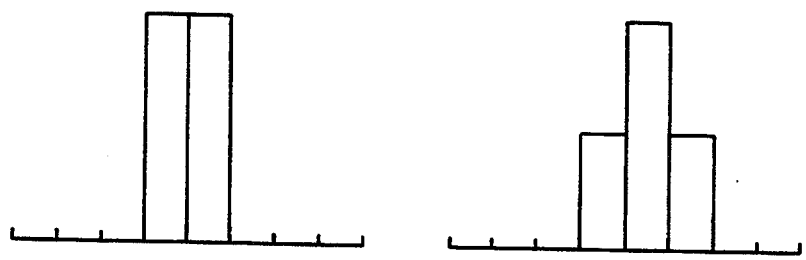
FIGS. 20A and 20B show examples of an object image signal.
Figure 20B:
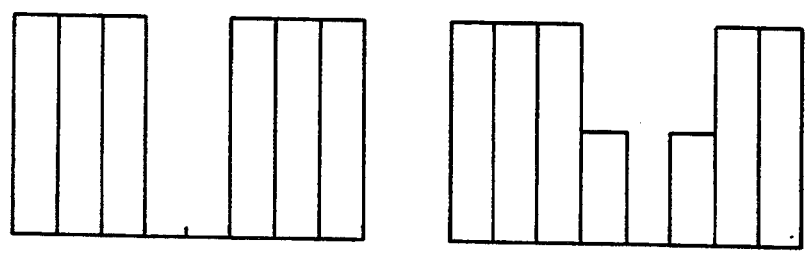
Figure 21A:
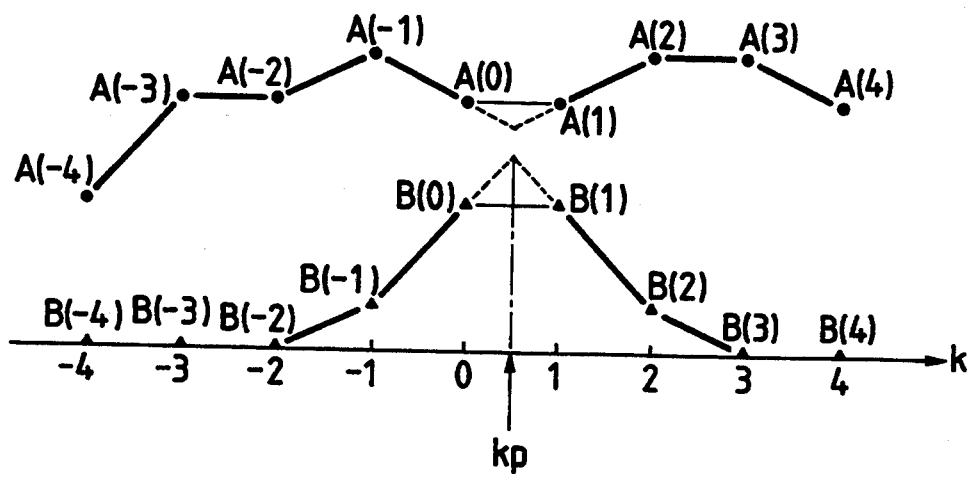
FIGS. 21A and 21B illustrate other examples of the correlation calculation by a combination of the examples of the prior art.
Figure 21B:
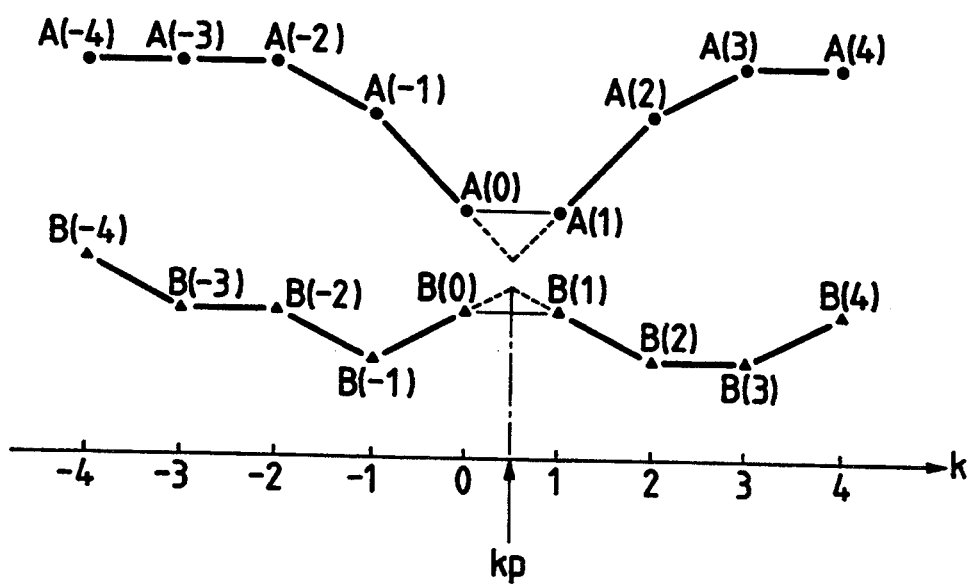

When an object image deviating by 0.5 picture element as shown in FIG. 13 is the object, kp=0.5 can be interpolated like the plot of the amount of correlation of FIG. 16 and correct image deviation detection is possible. However, if the object image deviates by 2.5 picture elements, the correlation extreme value of a decimal unit is interpolated and found from the amounts of correlation of three points, i.e., the shift k=2, 3, 4 or k=1, 2, 3 and therefore, if the continuity of the amount of correlation is spoiled at the shift k=2 and k=3, it may become a significant error factor.

In Prior Art Example 3, with this point taken into account, design is made such that the shift range assigned to a calculation area of the fiducial image partially overlaps the shift range of another calculation area. Thereby, the same calculation area of the fiducial image can be used for the amounts of correlation of three points used in interpolation calculation, and the continuity of the amounts of correlation of the three points can be kept.

In the image deviation detecting method of the present invention, there is no uncertainty in the above-described continuity of the amounts of correlation and therefore, the contrivance as in Prior Art Example 3 is unnecessary and correspondingly, the calculation time does not increase.

Figure 9:
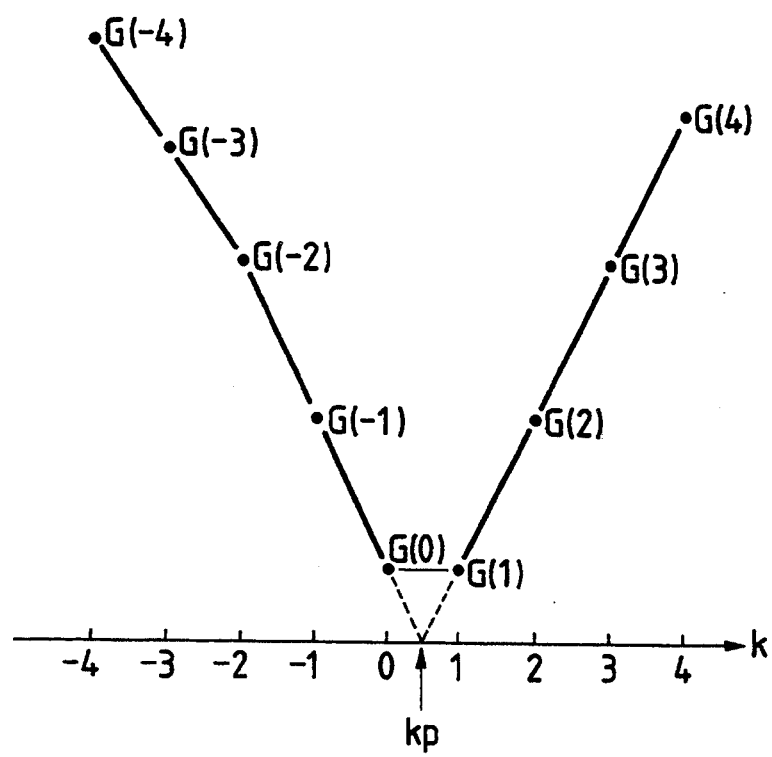
FIG. 9 illustrates another example of the interpolating operation for the amount of correlation.

FIG. 9 shows a graph in which the amount of correlation at each shift when "the absolute value of difference" as the operator is applied to the image deviation detecting method of the present invention is plotted.

The object image, like that in FIG. 1, is a geometrical edge image deviating by 0.5 picture elements.

As is apparent from FIG. 9, the amount of correlation does not become discontinuous between the shift k=2 and 3 or k=−2 and −3 and a correct amount of image deviation call be detected.

As described above, according to the present invention, prior to correlation calculation, the object image signal to be image-deviation-detected is duplicated and enlarged to double, and in correlation calculation, the amount of correlation is found by the "mutual shift" to thereby enable image deviation detection excellent in S/N, and further, if "a greater value (or a smaller value)" is used as the operator, the dependency on the object can be reduced, whereby highly accurate focus detection becomes possible.

Second Embodiment

In the first embodiment, the object image signal has been duplicated and enlarged to double and the amount of correlation has been found by the "mutual shift" correlation calculation. In a second embodiment, which will hereinafter be described, as the means for enlarging the signal amount, respective correlative functions are found for two kinds of continuous calculation picture element numbers differing by a picture element relative to a time-serial signal. From the aforementioned two kinds of correlative functions, two kinds of amounts of relative displacement are calculated and the mean of these two kinds of amounts of relative displacement is used as the amount of correlation displacement signal. Also, the "mutual shift" is used in correlation calculation, whereby highly accurate image deviation detection is made possible.

Figure 22:
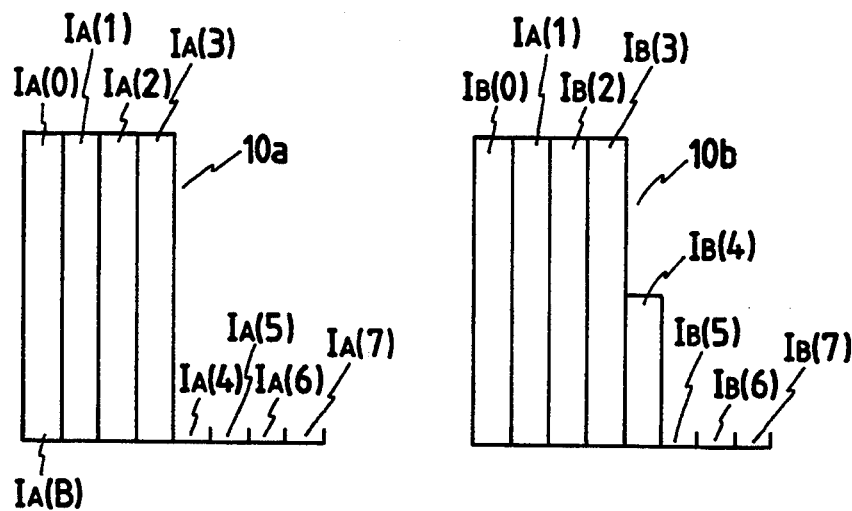
FIG. 22 illustrates the principle of a second embodiment of the present invention.
Figure 23A:
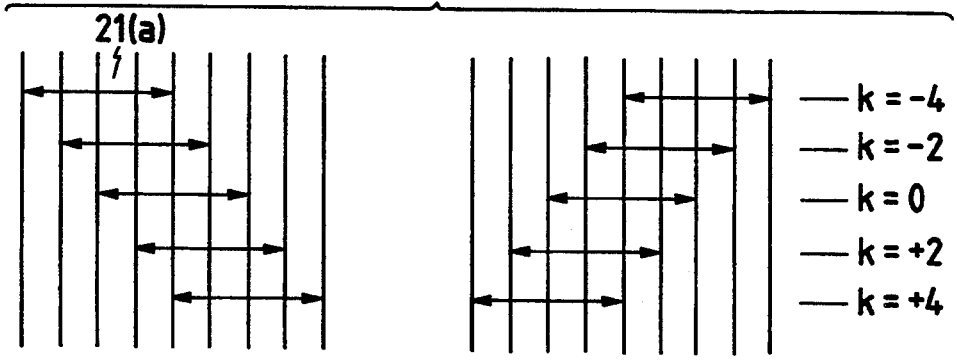
FIGS. 23A and 23B illustrate the principles of the second embodiment of the present invention with FIG. 22.
Figure 23B:
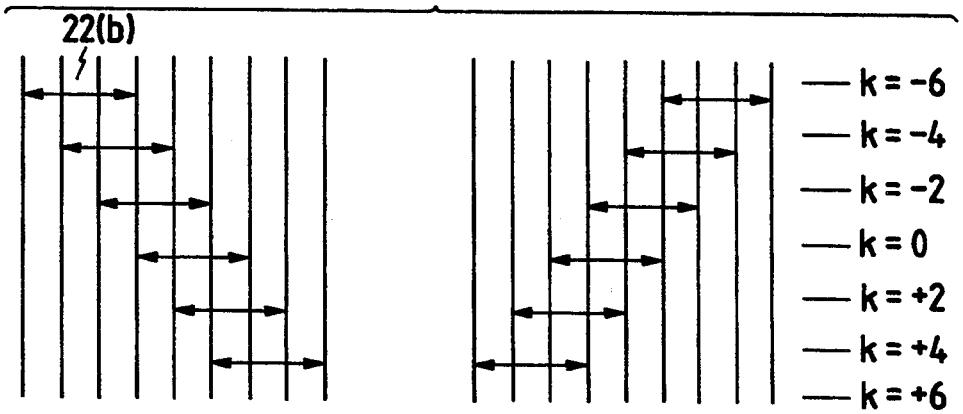

FIG. 22 shows image signals corresponding to the object image distributions on the surfaces of the sensor arrays 4a and 4b in FIG. 10. In FIG. 22, the reference characters 10a and 10b indicate the intensity distributions of two objects, and in this example, they represent a case where a simple geometrical edge image deviates by 0.5 picture elements. Also, in FIG. 22, the reference characters $I_A(0)-I_A(7)$ indicate the outputs of the picture elements of the sensor 10a and the reference characters $I_B(0)-I_B(7)$ indicate the outputs of the picture elements of the sensor 10b. FIGS. 23A and 23B show the setting of calculation areas accompanying a shift, and arrows 21(a) and 22(b) represent calculation areas for correlation calculation. FIG. 23A refers to a case where the number of calculation picture elements is 4, and FIG. 23B refers to a case where the number of calculation picture elements is 3. The two kinds of calculation picture element numbers in FIGS. 23A and 23B differ by a picture element from each other.

Figure 12:
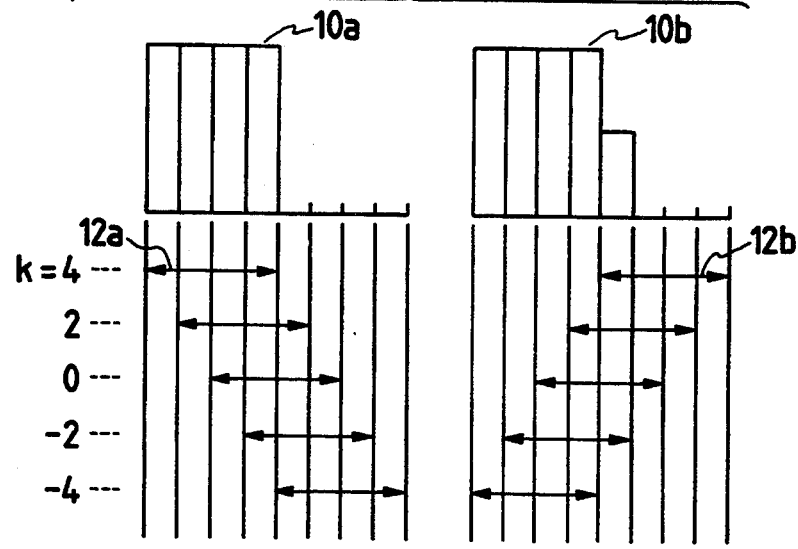
FIG. 12 illustrates the principle of correlation calculation according to the prior art.

Here, for the object image signals of FIG. 22, correlation calculation is effected by the same "mutual shift" as that of FIG. 12 in the calculation areas of FIGS. 23A and 23B. It should be noted that in the "mutual shift" of FIG. 12, two images are moved at a time and therefore the correlation calculation is correlation calculation of a two-shift unit.

Figure 24:
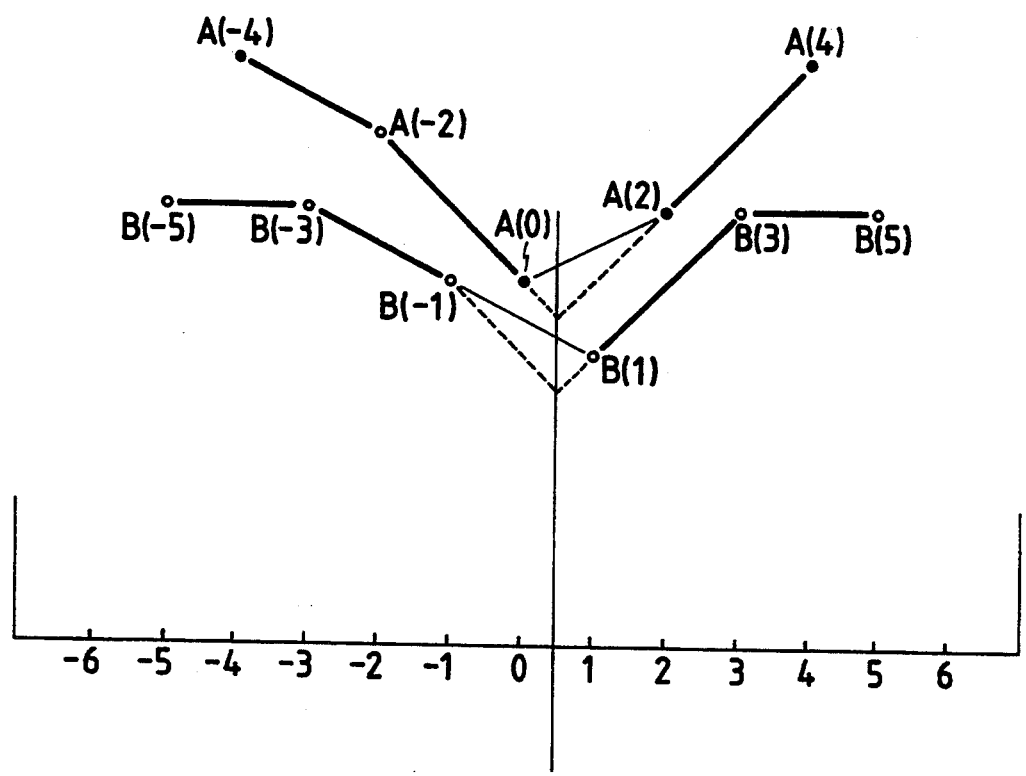
FIG. 24 is an illustration representing the result of the correlation calculation by the second embodiment.
Figure 25:
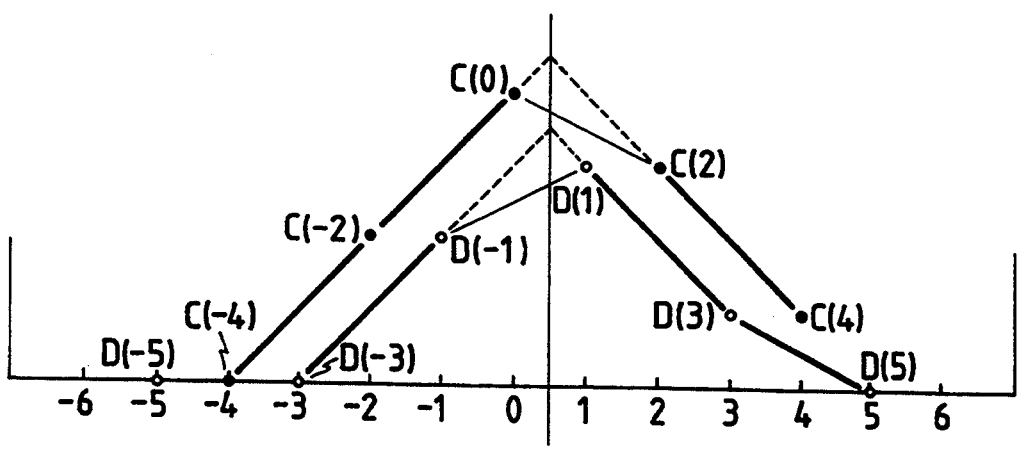
FIG. 25 is an illustration representing another example of the result of the correlation calculation.

FIGS. 24 and 25 show graphs in which the amount of correlation of correlation calculation at each shift is plotted.

The operator of FIG. 24 is "a greater value", and the amounts of correlation A (−4) to A(4) are the amounts of correlation when the number of calculation picture elements is 4, and the amounts of correlation B(−5) to B(5) are the; amounts of correlation when the number of calculation picture elements is 3. In the present embodiment, the average value of the amount of relative displacement found from the amounts of correlation A(−2) to A(2) by "the direct interpolation technique" and the amount of relative displacement found from the amounts of correlation B(−2) to B(1) by "the direct interpolation technique" is used as the amount of relative displacement of the object image signals, whereby the error of correlation calculation of a two-shift unit can be eliminated.

FIG. 25 shows a familiar example in which "a smaller value" is used as the operator. The amounts of correlation C(−4) to C(4) are the amounts of correlation when the number of calculation picture elements is 4, and the amounts of correlation D(−5) to D(5) are the amounts of correlation when the number of calculation picture elements is 3.

FIG. 26 shows a flow chart of the program of the microcomputer.

The "focus detection routine" of a step (S100) is called by the starting of the focus detecting operation, and at a step (S101), the inputting of the aforedescribed image signals is executed. The image signal 10a in FIG. 22 is defined as $I_A(0)$-$I_A(7)$, and the image signal 10b is defined as $I_B(0)$-$I_B(7)$.

A step (S102) represents the loop process about i, and at steps (S102) and (S103), correlation calculation in the calculation range represented in FIG. 23A is effected. In this case, "a smaller value" is used as the operator and with the amount of correlation at the shift k as COR1 (k), calculation is effected by the following expression (15):

$$COR1(k) \leftarrow \sum_{i=0}^{3} \text{Min}\left\{ I_A\left(2 + \frac{k}{2} + i\right), I_B\left(2 - \frac{k}{2} + i\right) \right\} \quad (15)$$

where k=−4, −2, 0, 2, 4.

The process at the steps (S102) and (S103) means the calculation of the amount of correlation by the above expression (15) using "a smaller value" in each calculation range at each k value shown in FIG. 23A.

That is, when k=−4, with the signals $I_A(0)$-$I_A(3)$ and the signals $I_B(4)$-$I_B(7)$ as objects, addition value of a smaller value of $I_A(0)$ and $I_B(4)$, a smaller value of $I_A(1)$ and $I_B(5)$, a smaller value of $I_A(2)$ and $I_B(6)$ and a smaller value of $I_A(3)$ and $I_B(7)$ is found as COR1 −4) . Also, when k=−2, with $I_A(1)$ - $I_A(4)$ and $I_B(3)$ - $I_B(6)$ as objects, the addition value of a smaller value of $I_A(1)$ and $I_B(3)$, a smaller value of $I_A(2)$ and $I_B(4)$, a smaller value of $I_A(3)$ and $I_B(5)$ and a smaller value of $I_A(4)$ and $I_B(6)$ is likewise found as COR1(−2).

Also, when k=0, when k=2 and when k=4, the addition values of smaller values of corresponding signals in $I_A$ and $I_B$ of respective ranges shown in FIG. 23A are found as COR1(0), COR1(2) and COR1(4) in the same manner.

It is to be understood that C(−4) - C(4) of FIG. 25 represent the amounts of correlation COR1(−4) - COR1(4) found at the steps (S102) and (S103). In this case, C(0)=COR1(0) of k=0 is the extreme value of the amount of correlation.

When the calculation of the amount of correlation COR1(k) when the shift k is every two other shifts of −4 to +4 is completed, the detection of the relative extreme value is effected at steps (S104)-(S108). When "a smaller value" is adopted as the operator, the amount of correlation COR1(k) ought to become greatest at a shift in which correlation is greatest. Therefore, at the step (S104), 0 as the initial value is given in advance to a variable CORMAX storing the maximum value of the amount of correction therein. The step (S105) represents the loop process about k, and searches for the extreme value of the amount of correlation over the range of k=−2 to +2.

As the conditions of the search for the extreme value, use is made of "the greatest" and "greater than the two points before and behind". At the step (S106), whether the amount of correlation COR1(k) is greatest is judged, and at the step (S107), whether COR1(k) is greater than the amounts of correlation COR1(k−2) and COR1(k+2) of the two points before and behind is judged. Only when the both conditions are satisfied, is a shift made to the step (S108), where the variable CORMAX1 of the maximum value of the amount of correlation is renewed by the value of COR1(k) and at the same time, the current value of the shift k is stored into the extreme value shift kx. In order to effect the judgment of the step (S107) at which the amount correlation is compared with the values of the two points before and behind, the loop process of the step (S105) renders k into −2 to +2, i.e., narrower than the shift range (−4 to +4) in which correlation calculation has been actually effected.

The search for the extreme value at the step (S105) will now be described with FIG. 25 as an example.

First, at the step (S106), C (−2) and CORMAX1=0 are compared with each other and since C(−2)≦0, at the step (S107), the comparison between the magnitudes of C(−2) and C(−4) and the comparison between the magnitudes of C(−2) and C(0) are effected. Since C(0)>C(−2), the step (S108) is not executed and the shift k is set to k=0, and at the step (S106), C(0) and CORMAX1 are again compared with each other, and at the step (S106), the comparison between the magnitudes of C(0) and C(−2) and the comparison between the magnitudes of C(0) and C(2) are effected. Since in this case, C(0)>C(−2) and C(0)>C(2), the step (S108) is executed and CORMAX1 is set to the value of C(0). Also, the then k is set as kx, and kx=0. Thereafter, with k as 2, the step (S106) is executed. Since CORMAX1=C(0)>C(2), the steps (S107) and (S108) are not executed and the process at the step (S105) is terminated and it is detected that the relative extreme value was C(0) when kx=0.

When the correlation extreme value is detected at the steps (S105)-(S108), the interpolation of the correlation extreme value is effected at the next step (S109) to find the amount of image deviation at a measure smaller than the shift unit.

As the interpolation method, use is made of the direct interpolation method of effecting interpolation from the amounts of correlation of three points, i.e., the shift of the greatest value and the two points before and behind it, as previously described. Here, as an example, an attempt is made to effect interpolation calculation by the method of Prior Art Example 3.

Figures 28A, 28B:
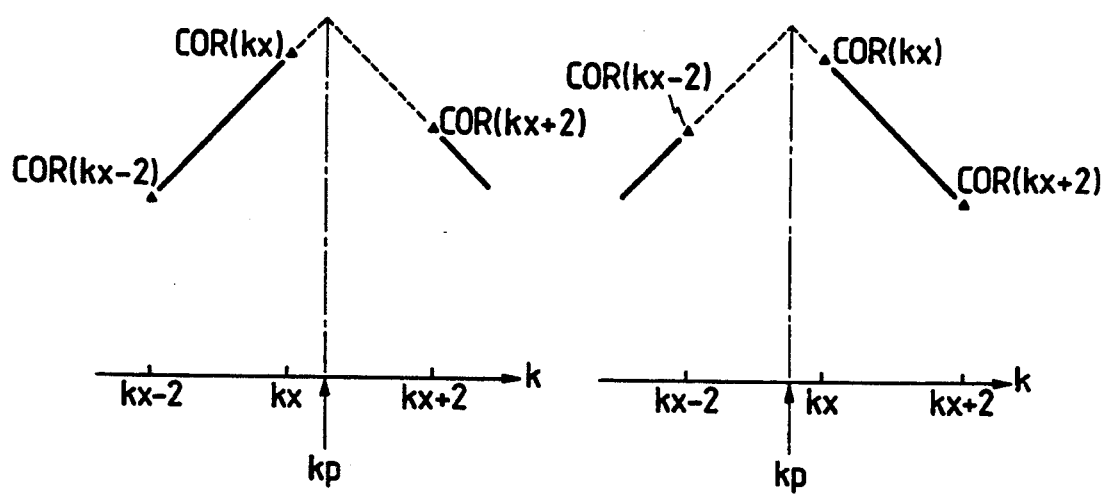

When as shown in FIGS. 28A and 28B, the amount of correlation COR(kx) having "a smaller value" as the operator in the shift kx becomes greatest, depending on the magnitudes of the values of COR(kx−2) and COR(kx+2), there are conceivable a case where COR(kx−2)≦COR(kx+2) (FIG. 28A) and a case where COR(kx−2)>COR(kx+2) (FIG. 28B).

When as shown in FIG. 28A, COR(kx−2)≦COR(kx+2), the k coordinates of the point of intersection between a straight line passing through COR(kx−2) and COR(kx) and a straight line opposite in the sign of inclination to said straight line and passing through COR(kx+2) are defined as an amount of image deviation kp of a decimal or less.

When as shown in FIG. 28B, COR(kx−2)>COR(kx+2), the k coordinates of the point of intersection between a straight line passing through COR(kx) and COR(kx+2) and a straight line opposite in the sign of inclination to said straight line and passing through COR(kx−2) are defined as kp.

The amount of image deviation kp is expressed as follows:

(i) When COR(kx−2)≦COR(kx−2), $$kp = kx + \frac{COR(kx + 2) - COR(kx - 2)}{COR(kx) - COR(kx - 2)}, \quad (16)$$

(ii) When COR(kx−2)>COR(kx+2), $$kp = kx + \frac{COR(kx + 2) - COR(kx - 2)}{COR(kx) - COR(kx + 2)} \quad (17)$$

In the manner described above, the amount of image deviation kp ($P_1$) is found from the greatest correlation COR(kx) and the amounts of correlation COR(kx−2) and COR(kx+2) of the two points before and behind it.

As described above, at the steps (S102)–(S109), the amount of image deviation when the number of shift reference picture elements represented in FIG. 23A is 4 has been detected.

Subsequently, at steps (S110)–(S117), the amount of image deviation when the number of shift reference picture elements represented in FIG. 23B is 3 is detected by the use of a similar method. First, at the steps (S110)–(S111), the correlation calculation represented in FIG. 23B is effected, In this case, "a smaller value"-similar to that used at the steps (S102)–(S103) is used as the operator and the amount of correlation COR2(k) at the shift k is calculated from the following expression:

$$COR2(k) = \sum_{i=0}^{2} \text{Min}\left\{ I_A\left(2 + \frac{k+1}{2} + i\right), I_B\left(3 - \frac{k+1}{2} + i\right) \right\},$$

where k=−5, −3, −1, +1, +3, +5.

When the calculation of the amount of correlation COR2(k) at every other Z shift in which the shift k is −5 to 5 is completed, the detection of the relative extreme value is effected at the steps (S113)–(S116) in the same manner as at the steps (S105)–(S108). two kinds of continuous calculation picture element numbers differing by a picture element relative to a time-serial signal, and two kinds of amounts of relative displacement are calculated on the basis of them, and the mean of these two kinds of amounts of relative displacement is regarded as the amount of relative displacement of the time-serial signal, whereby highly accurate image deviation detection is made possible.

As the interpolation method at the step (S109), besides the method of interpolating kp by a straight line and finding it as in FIGS. 28A and 28B, kp may be found as the extreme value of a quadratic function through which three points, i.e., the amounts of correlation COR(kx−2), COR(kx) and COR(kx+2), pass.

Figure 29:
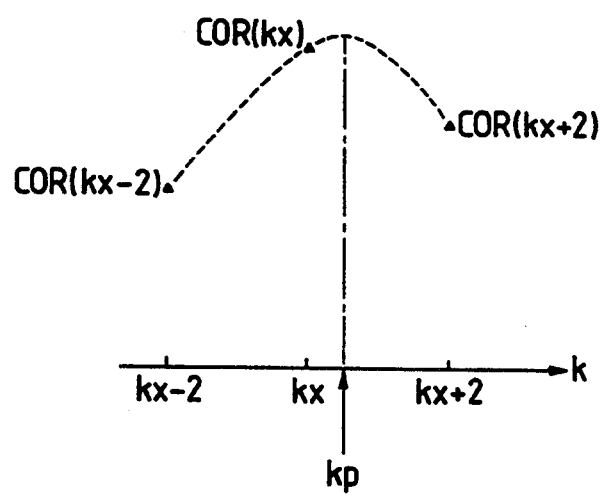
FIG. 29 illustrates another example of the interpolating operation for the amount of correlation.

FIG. 29 shows an example in which the amount of image deviation kp is interpolated by a quadratic function.

When the greatest correlation COR(kx) and the two points before and behind it, i.e., COR(kx−2) and COR(kx+2) are given, each coefficient of a quadratic function COR(k)=$ak^2$+bk+c passing through those three points is found, and the extreme value k=−b/2a of the quadratic function is regarded as kp. kp is found from the following expression:

$$kp = kx + \frac{COR(kx + 2) - COR(kx - 2)}{2COR(kx) - COR(kx + 2) - COR(kx - 2)} \quad (18)$$

In order to effect the judgment of the step (S115) which compares the amount of correlation with the values of the two points before and behind, the loop process of the step (S113) is rendered into k=−3 to +3, i.e., narrower than the shift range (−5 to +5) in which correlation calculation has actually been done.

When at the steps (S113)–(S116), the correlation extreme value is detected, at the next step (S117), the interpolation of the correlation extreme value is effected to find the amount of image deviation at a measure smaller than the shift unit.

As the interpolation method, use is made of a method of effecting interpolation from the amounts of correlation of total three points, i.e., the shift of the greatest value and the two points before and behind it as at the step (S109), and the amount of image deviation ($P_2$) is found.

In FIG. 25, D(1) of k=1 is the extreme value of the amount of correlation. Finally at a step (S118), the mean of the amounts of image deviation calculated in two kinds of continuous calculation picture element numbers differing by a picture element from each other is taken and that mean value is regarded as the amount of image deviation to be finally found.

Figure 26B:
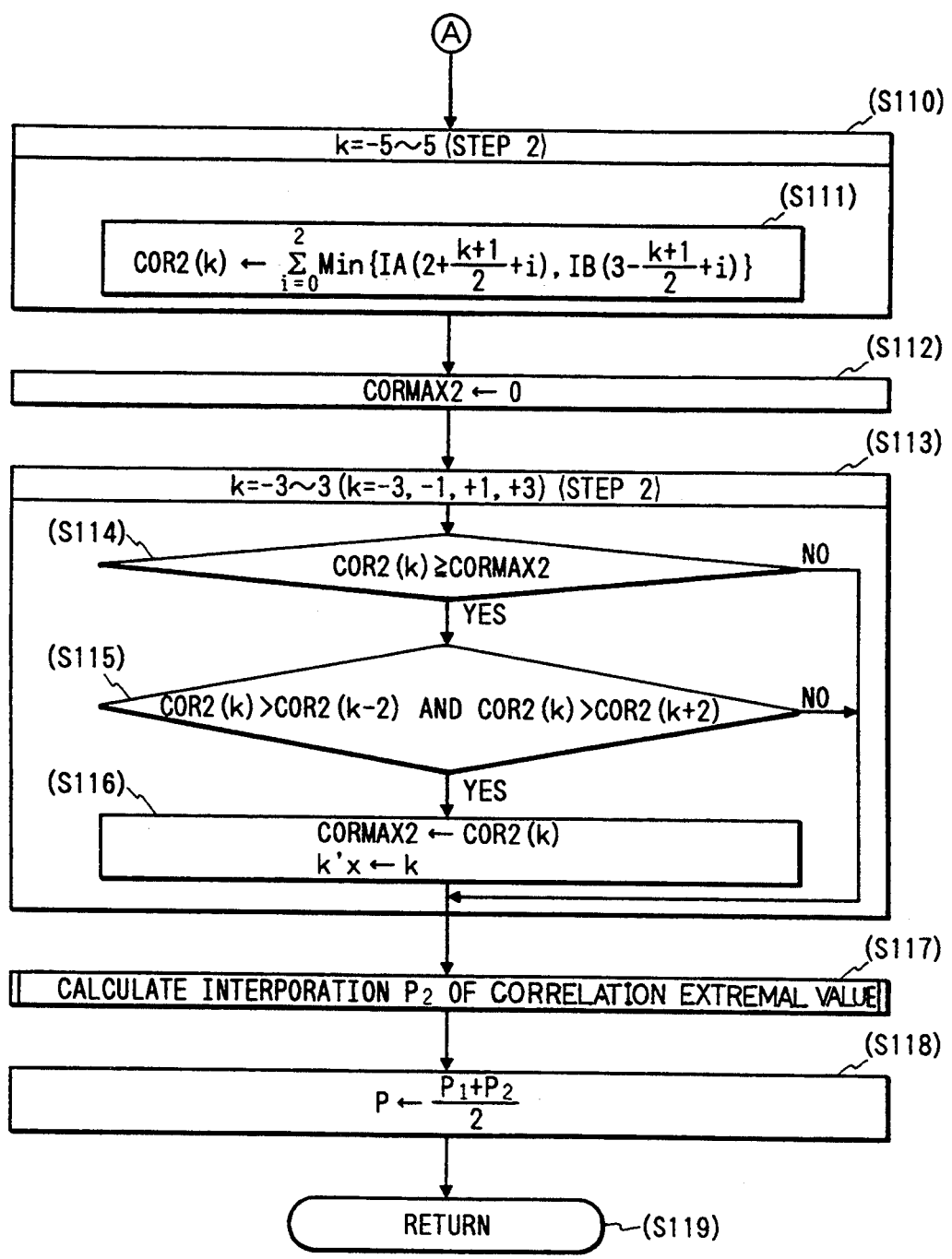
Figure 27A:
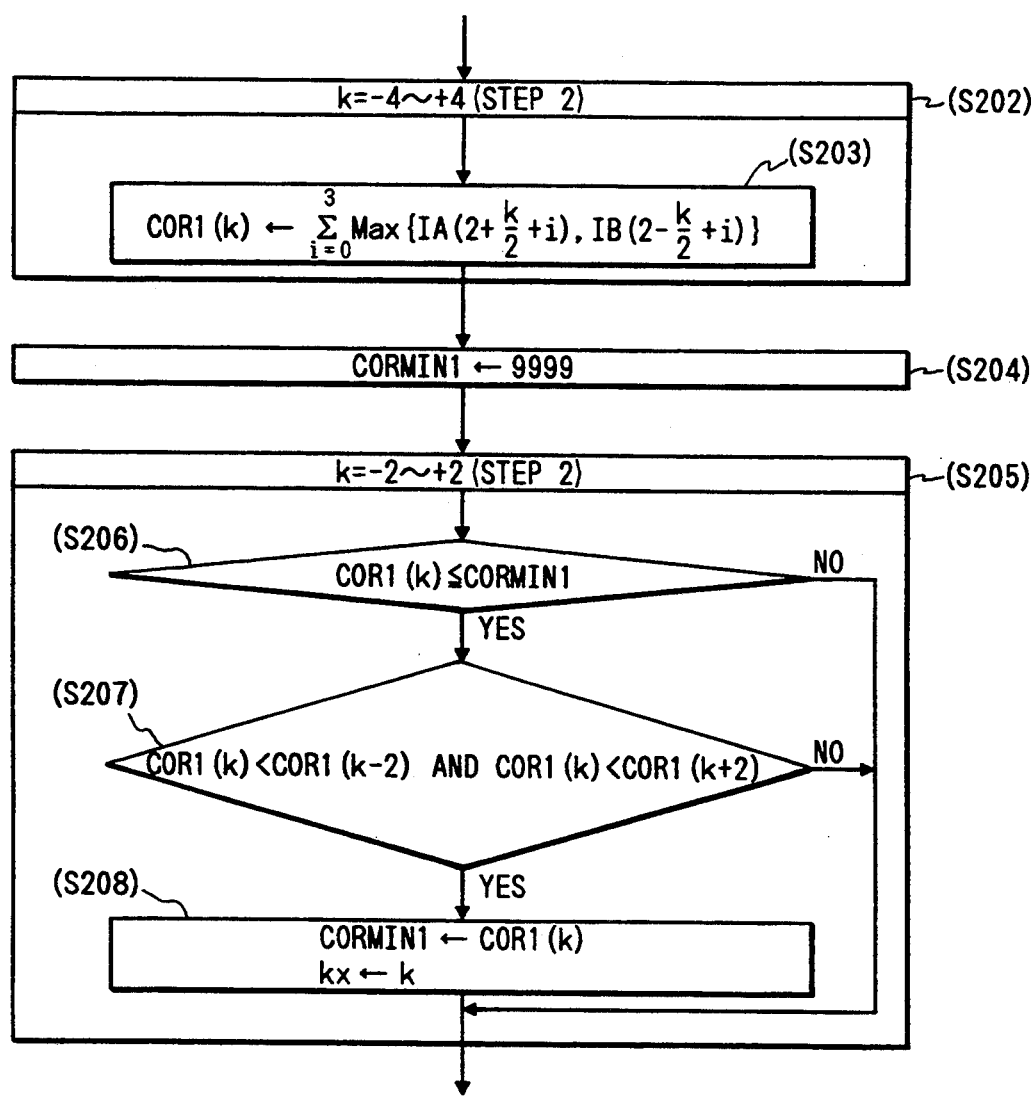
FIGS. 27A and 27B are diagrams showing another example of the flow shown in FIG. 26.
Figure 27B:
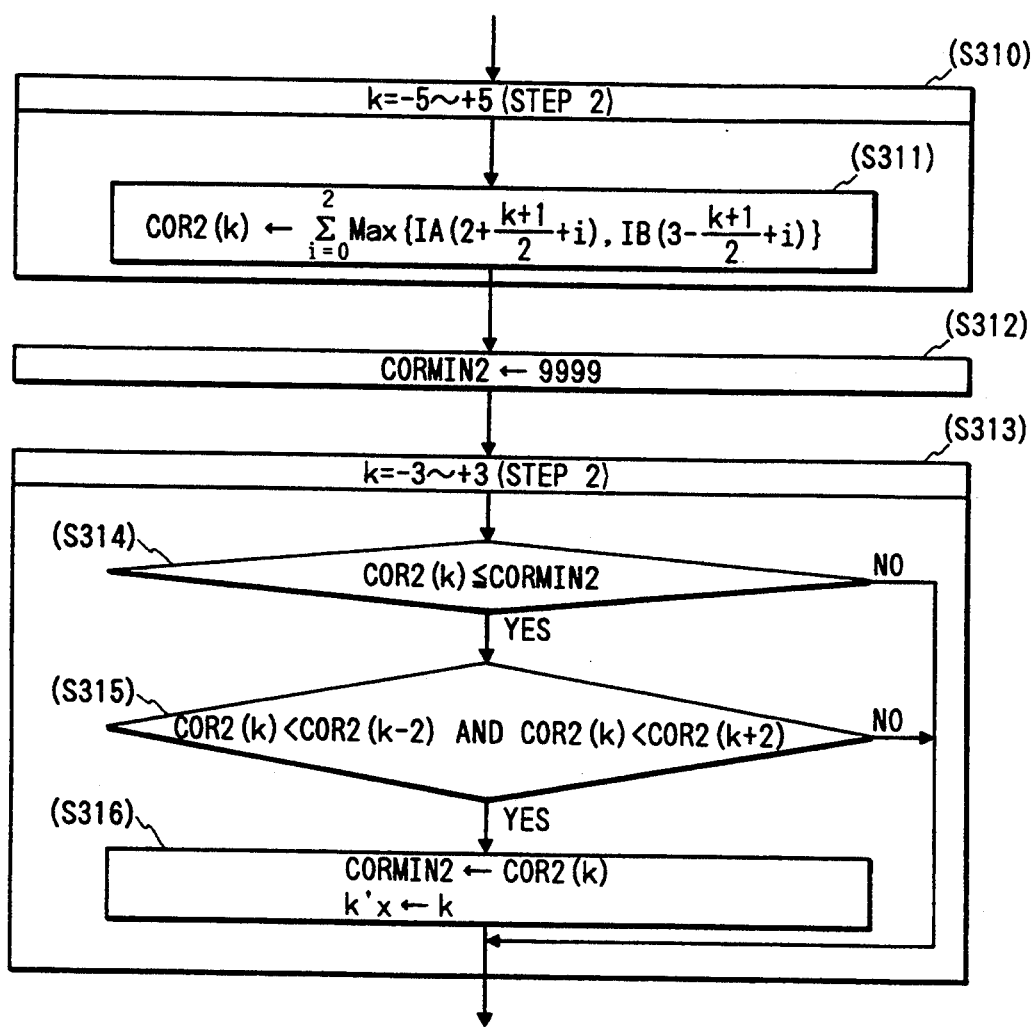

As described above, in the present embodiment, respective correlation functions are calculated for In the flow of FIG. 26, there is shown a case where "a smaller value" is used as the operator, and portions of a flow chart when "a greater value" is used as the operator are shown in FIGS. 27A and 27B.

The steps (S202)–(S208) of FIG. 27A correspond to the steps (S102)–(S108) of FIG. 26, and the steps (S310)–(S316) of FIG. 27B correspond to the steps (S110)–(S116) of FIG. 26. The difference between the two will be described here. When the amount of correlation is to be calculated at the steps (S203) and (S311), "a greater value" is used as the operator. When "a greater value" is used as the operator, the amount of correlation thereof is a minimum for a maximum correlation.

At the next steps (S204) and (S312), the initial value 9999 is stored in variables CORMIN1 and CORMIN2 representative of the minimum values of the amount of correlation. This initial value 9999 is not restrictive, but a great value the amount of correlation cannot assume can be stored in the variables.

At the steps (S206), (S207), (S208) and the steps (S314), (S315), (S316), "the smallest" and "smaller than the two points before and behind" are the conditions of the search for the extreme value, and when these conditions are satisfied, the minimum value variables CORMEN1, CORMIN2 and the shift kx and shift kx' are renewed at the steps (S208) and (S316).

With regard to the interpolation of the correlation extreme value, where the extreme value is interpolated by a straight line, case classification somewhat differs depending on which of a maximum value and a minimum value is to be found. That is, when COR(kx−2)≦COR(kx+2), expression (16) is applied, and when COR(kx−2)<COR(kx+2), expression (17) is applied. Where as shown in FIG. 29, the correlation extreme value is interpolated by a quadratic function, the operator is not resorted to but expression (18) is resorted to as a matter of course.

As described above, in the present embodiment, respective correlation functions are calculated for two kinds of continuous calculation picture element numbers differing by a picture element relative to a time-serial signal, and two kinds of amounts of relative displacement are calculated on the basis of them, and the mean of these two kinds of amounts of relative displacement is regarded as the amount of relative displacement of said time-serial signal. Also, if the "mutual shift" is used in correlation calculation, highly accurate image deviation detection will become possible.

What is claimed is:

1. A detection device comprising a first sensor portion provided with a plurality of light receiving portions and a second sensor portion provided with a plurality of light receiving portions and performing signal processing for focusing on the basis of outputs of said first and second sensor portions, said detection device comprising:

(a) a first circuit for transforming an output signal of each of said light receiving portions of said first sensor portion into a plurality of output signals which have the same signal level as said output signals, said transformation being performed on every output signal of each of said light receiving portions;

(b) a second circuit for transforming an output signal of each of said light receiving portions of said second sensor portion into a plurality of output signals which have the same signal level as said output signals, said transformation being performed on every output of each of said light receiving portions;

(c) a correlation calculation circuit for performing correlation calculation between the plurality of output signals transformed by said first circuit and the plurality of output signals transformed by said second circuit.

2. A detection device according to claim 1, wherein said first circuit and said second circuit transform the output signal of each of the light receiving portions of said first and second circuits into two signals.

3. A detection device comprising a first sensor portion provided with a plurality of light receiving portions and a second sensor portion provided with a plurality of light receiving portions and performing signal processing for focusing on the basis of outputs of said first and second sensor portions, said detection device comprising:

(a) a first circuit for transforming an output signal of each of said light receiving portions of said first sensor portion into a plurality of output signals which have the same signal level as said output signals said transformation being performed on every output of each of said light receiving portions;

(b) a second circuit for transforming an output signal of each of said light receiving portions of said second sensor portion into a plurality of output signals which have the same signal level as said output signals, said transformation being performed on every output of each of said light receiving portions;

(c) taking out circuit for shifting, every predetermined number, a predetermined number of continuous signals among the plurality of signals produced by said first circuit and for taking out the predetermined number of continuous signals for each shift as a first signal series and for shifting, every predetermined number, a predetermined number of continuous signals among the plurality of signals produced by said second circuit and for taking out the predetermined number of continuous signals for each shift as a second signal series; and (d) a calculation circuit for performing a correlation calculation between signals of the first signal series and signals of the second signal series taken out by said taking out circuit, the calculation being performed on every signal series for each shift.

4. A detection device according to claim 3, wherein said taking out circuit shifts the signal by one signal at each shift.

5. A detection device according to claim 4, wherein said calculation circuit calculates an extreme value of the correlation calculation and performs the signal processing operation for focusing in accordance with the extreme value.

6. A detection device comprising a first sensor portion provided with a plurality of light receiving portions and a second sensor portion provided with a plurality of light receiving portions and performing signal processing for focus detection on the basis of outputs of said first and second sensor portions, said detection device comprising:

(a) a first circuit for transforming an output signal of each of said light receiving portions of said first sensor portion into a plurality of output signals which have the same signal level as said output signals, said transformation being performed on every output of each of said light receiving portions;

(b) a second circuit for transforming an output signal of each of said light receiving portions of said second sensor portion into a plurality of output signals which have the same signal level of said output signals, said transformation being performed on every output of each of said light receiving portions; and (c) a calculation circuit for performing a correlation calculation between the plurality of output signals transformed by said first circuit and the plurality of output signals transformed by said second circuit.

7. A detection device according to claim 6, wherein said first circuit and second circuit transform the output signal of each of the light receiving portions into two signals.

8. A detection device comprising a first sensor portion provided with a plurality of light receiving portions and a second sensor portion provided with a plurality of light receiving portions and performing signal processing for focus detection on the basis of outputs of said first and second sensor portions, said detection device comprising:

(a) a first circuit for transforming an output signal of each of said light receiving portions of said first sensor portion into a plurality of output signals which have the same signal level as said output signals, said transformation being performed on every output of each of said light receiving portions;

(b) a second circuit for transforming an output signal of each of said light receiving portions of said second sensor portion into plurality of output signals which have the same signal level as said output signals, said transformation being performed on every output of each of said light receiving portions;

(c) a taking out circuit for shifting, every predetermined number, a predetermined number of continuous signals among the plurality of output Signals transformed by said first circuit and for taking out the predetermined number of continuous signals for each shift as a first signal series and for shifting, every predetermined number, a predetermined number of continuous Signals among the plurality of output signals transformed by said second circuit and for taking out the determined number of continuous signals for each shift as a second signal series; and (d) a calculation circuit for performing a correlation calculation between signals of the first signal series and signal of the second signals series taken out by said taking out circuit, the calculation being performed every signal series for each shift.

9. A detection device according to claim 8, wherein said taking out circuit shifts the signal by one signal at each shift.

* * * * *

UNITED STATES PATENT AND TRADEMARK OFFICE
CERTIFICATE OF CORRECTION

PATENT NO. : 5,381,206
DATED : January 10, 1995
INVENTOR(S) : AKIRA AKASHI, ET AL.

Page 1 of 7

It is certified that error appears in the above-indentified patent and that said Letters Patent is hereby corrected as shown below:

At [57] Abstract
    Line 6,
"Information" should read --information--.

In the drawing,
Sheet 3

Figure 4A, "EXTREMAL" should read --EXTREME--.

Sheet 18

Figure 26A, "INTERPORATION" should read --INTERPOLATION-- and "EXTREMAL" should read --EXTREME--.

Sheet 19

Figure 26B, "INTEPORATION" should read --INTERPOLATION-- and "EXTREMAL" should read --EXTREME--.

Column 2

Line 17, close-up left margin.

Column 5

Line 54, "shift," should read --shift",--.

UNITED STATES PATENT AND TRADEMARK OFFICE
CERTIFICATE OF CORRECTION

PATENT NO. : 5,381,206     Page 2 of 7

DATED : January 10, 1995

INVENTOR(S) : AKIRA AKASHI, ET AL.

It is certified that error appears in the above-indentified patent and that said Letters Patent is hereby corrected as shown below:

Column 6

Line 49, "value"]or" should read --value" or--.
    Line 56, "F-4)-F(4)" should read --F(-4)-F(4)--.

Column 8

Line 33, ".amount" should read --amount--.

Column 9

Line 8, "became" should read --become--.

Column 10

Line 10, "aspect" should read --aspects-- and "Invention" should read --invention--.

Column 12

Line 31, "of" should read --of a--.
    Line 35, "in" should read --in a--.
    Example 5, "JA(2·i)→IA(i)...(5)" should read
          --JA(2·i)←IA(i)...(5)--.
    Example 6, "JA(2·i+1)→IA(i)...(6)" should read
          --JA(2·i+1)←IA(i)...(6)--.
    Example 7, "JB(2·i)→IB(i)...(7)" should read
          --JB(2·i)←IB(i)...(7)--.
    Example 8, "JB(2·i+1)→IB(i)...(8)" should read
          --JB(2·i+1)←IB(i)...(8)--.
    Line 61, "JB(0)-JB(1)," should read --JB(0)-JB(15),--.

UNITED STATES PATENT AND TRADEMARK OFFICE
CERTIFICATE OF CORRECTION

PATENT NO. : 5,381,206

DATED : January 10, 1995

INVENTOR(S) : AKIRA AKASHI, ET AL.

It is certified that error appears in the above-indentified patent and that said Letters Patent is hereby corrected as shown below:

Column 13

Line 19, "COR -4)." should read --COR (-4).--
Line 46, "step (S110), should read --step (S110),--
Line 55, "calculateion" should read --calculation--.

Column 14

Line 50, ">COR(kx+1)," should read --<COR (kx+1),--.

Column 15

Line 9, ".represents" should read --represents--.
Line 40, "smallest" should read --"smaller--.
Line 50, "COR(kx-1)$\leq$COR(kx+1)," should read --COR(kx-1)$\geq$COR(kx+1),--.

Column 16

Line 14, "nunsher" should read --number--.

Column 17

Line 23, "inethod" should read --method--.
Line 39, "ment" should read --ments--.

Column 18

Line 68, "the;" should read --the--.

UNITED STATES PATENT AND TRADEMARK OFFICE
CERTIFICATE OF CORRECTION

PATENT NO. : 5,381,206      Page 4 of 7
DATED : January 10, 1995
INVENTOR(S) : AKIRA AKASHI, ET AL.

It is certified that error appears in the above-indentified patent and that said Letters Patent is hereby corrected as shown below:

Column 19

Line 6, "B(-2)" should read --B(-1)--.
    Line 47, "COR1 -4)" should read --COR1(-4).--
    Line 48, ".Also," should read --Also,--.
    Line 61, "of" (first occurrence) should read --if--.

Column 20

Line 30, "$C(-2) \leq 0$," should read --$C(-2) \geq 0$,--.

Column 21

Line 25, "In" should read --¶ In--.
    Line 33, "(S110)-(S1 17)," should read --(S110)-(S117),--.

Line 38, "effected," should read --effected.-- and "value"-" should read --value"--.
    Line 55, "(S113)-(S116)" should read --(S113)-(S116)--.
    Line 56, "two kinds of" should be deleted.
    Line 57 to 68, delete in its entirety.

UNITED STATES PATENT AND TRADEMARK OFFICE
CERTIFICATE OF CORRECTION

PATENT NO. : 5,381,206

DATED : January 10, 1995

INVENTOR(S) : AKIRA AKASHI, ET AL.

It is certified that error appears in the above-indentified patent and that said Letters Patent is hereby corrected as shown below:

Column 22

Line 1 to 15, delete in its entirety.
    Line 17, "In" should read --¶ In-- and "step(S115)" should read --step (S115)--.
    Line 23, "(S113)-(S116)," should read --(S113)-(S116),--.
    Line 24, "step(S117)," should read --step (S117),--.
    Line 35, "step(S118)," should read --step (S118),--.
    Line 42, after "for", insert --two kinds of continuous calculation picture element numbers differing by a picture element relative to a tine-serial signal, and two kinds of amounts of relative displacement are calculated on the basis of them, and the mean of these two kinds of amounts of relative displacement is regarded as the amount of relative displacement of the time-serial signal, whereby highly accurate image deviation detection is made possible.

As the interpolation method at the step (S109), besides the method of interpolating kp by a straight line and finding it as in FIGS. 28A and 28B, kp may be found as the extreme value of a quadratic function through which three points, i.e., the amounts of correlation COR(kx-2), COR(kx) and COR(kx+2), pass.

FIG. 29 shows an example in which the amount of image deviation kp is interpolated by a quadratic function.

When the greatest correlation COR(kx) and the two points before and behind it, i.e., COR(kx-2) and COR(kx+2) are given, each coefficient of a quadratic function $COR(k)=ak^2+bk+c$ passing through those three points is found, and the extreme value $k=-b/2a$ of the quadratic function is regarded as kp. kp is found from the following expression:

$$kp = kx + \frac{COR(kx+2) - COR(kx-2)}{2COR(kx) - COR(kx+2) - COR(kx-2)}$$

UNITED STATES PATENT AND TRADEMARK OFFICE
CERTIFICATE OF CORRECTION

PATENT NO. : 5,381,206     Page 6 of 7
DATED : January 10, 1995
INVENTOR(S) : AKIRA AKASHI, ET AL.

It is certified that error appears in the above-indentified patent and that said Letters Patent is hereby corrected as shown below:

Column 22

Line 51, "(S110)-(S116)" should read --(S110)-(S116)--.

Column 23

Line 1, "CORMEN 1," should read --CORMIN 1,--.
  Line 8, "$\leq$COR(kx+2)," should read --$\geq$COR(kx+2),--.
  Line 46, "tions;" should read --tions; and--.
  Line 68, "signals" should read --signals,--.

Column 24

Line 10, "taking" should read --a taking--.

Column 25

Line 12, "into" should read --into a--.
  Line 19, "Signals" should read --signals--.

UNITED STATES PATENT AND TRADEMARK OFFICE
CERTIFICATE OF CORRECTION

PATENT NO. : 5,381,206

DATED : January 10, 1995

INVENTOR(S) : AKIRA AKASHI, ET AL.

It is certified that error appears in the above-indentified patent and that said Letters Patent is hereby corrected as shown below:

<u>Column 26</u>

Line 5, "Signals" should read --signals--.
    Line 7, "determined" should read --predetermined--.
    Line 12, "signal" should read --signals-- and "signals" should read --signal--.

Signed and Sealed this

Eighteenth Day of July, 1995

Attest:

BRUCE LEHMAN

*Attesting Officer*     *Commissioner of Patents and Trademarks*